United States Patent
Enomoto et al.

(10) Patent No.: US 8,902,733 B2
(45) Date of Patent: Dec. 2, 2014

(54) COMMUNICATION NETWORK MANAGEMENT SYSTEM, METHOD AND PROGRAM, AND MANAGEMENT COMPUTER

(75) Inventors: Nobuyuki Enomoto, Tokyo (JP); Toshio Koide, Tokyo (JP); Hideyuki Shimonishi, Tokyo (JP)

(73) Assignee: NEC Corporation, Tokyo (JP)

( * ) Notice: Subject to any disclaimer, the term of this patent is extended or adjusted under 35 U.S.C. 154(b) by 622 days.

(21) Appl. No.: 12/998,754

(22) PCT Filed: Nov. 12, 2009

(86) PCT No.: PCT/JP2009/069284
§ 371 (c)(1),
(2), (4) Date: May 27, 2011

(87) PCT Pub. No.: WO2010/064532
PCT Pub. Date: Jun. 10, 2010

(65) Prior Publication Data
US 2011/0231545 A1    Sep. 22, 2011

(30) Foreign Application Priority Data
Dec. 2, 2008  (JP) .................................. 2008-307670

(51) Int. Cl.
| | |
|---|---|
| *H04J 3/14* | (2006.01) |
| *H04L 12/717* | (2013.01) |
| *H04L 12/24* | (2006.01) |
| *H04L 12/26* | (2006.01) |
| *H04L 12/751* | (2013.01) |
| *H04L 12/703* | (2013.01) |
| *H04L 12/721* | (2013.01) |

(52) U.S. Cl.
CPC ............ *H04L 43/0811* (2013.01); *H04L 45/42* (2013.01); *H04L 45/26* (2013.01); *H04L 41/069* (2013.01); *H04L 41/0213* (2013.01); *H04L 45/026* (2013.01); *H04L 45/28* (2013.01)
USPC .......................................... 370/224; 709/224

(58) Field of Classification Search
None
See application file for complete search history.

(56) References Cited

U.S. PATENT DOCUMENTS

| | | |
|---|---|---|
| 6,700,874 B1 | 3/2004 | Takihiro et al. |
| 6,859,895 B2 | 2/2005 | Kitamura |

(Continued)

FOREIGN PATENT DOCUMENTS

| | | |
|---|---|---|
| JP | S 63-155836 A | 6/1988 |
| JP | 3-191464 A | 8/1991 |

(Continued)

OTHER PUBLICATIONS

S. Shah et al., "Extreme Networks' Ethernet Automatic Protection Switching (EAPS) Version 1", The Internet Society, Oct. 2003, http://tools.ietf.org/html/rfc3619.

(Continued)

*Primary Examiner* — Andrew Lai
*Assistant Examiner* — Leon Andrews
(74) *Attorney, Agent, or Firm* — McGuinn IP Law Group, PLLC

(57) ABSTRACT

A communication network management system has: a communication network including a plurality of nodes and a plurality of links connecting between the plurality of nodes; and a management computer that manages the communication network. The management computer has: a storage means in which a route information indicating a transfer route of frames in the communication network is stored; and a monitoring means configured to perform, based on the route information, transmission and reception of frames to and from the communication network. The monitoring means transmits a frame to the transfer route. Each of the plurality of nodes, when receiving a frame, not only forwards the received frame along the transfer route but also sends a reply to the management computer. The monitoring means identifies a location of failure occurrence on the transfer route, based on reception state of the reply from the plurality of nodes.

25 Claims, 39 Drawing Sheets

(56) References Cited

U.S. PATENT DOCUMENTS

| | | |
|---|---|---|
| 7,075,889 B2 | 7/2006 | Shiozawa |
| 7,468,944 B2 | 12/2008 | Nishioka et al. |
| 7,539,775 B2 * | 5/2009 | Rikitake et al. ............ 709/246 |
| 2001/0027484 A1 | 10/2001 | Nishi |
| 2002/0105915 A1 | 8/2002 | Hamada |
| 2003/0021293 A1 | 1/2003 | Harasaki |
| 2003/0072270 A1 | 4/2003 | Guerin et al. |
| 2003/0137932 A1 | 7/2003 | Nishioka et al. |
| 2003/0198190 A1 | 10/2003 | Rajan et al. |
| 2004/0103210 A1 | 5/2004 | Fujii et al. |
| 2004/0132451 A1 | 7/2004 | Butehorn et al. |
| 2004/0148432 A1 | 7/2004 | Udono et al. |
| 2004/0153529 A1 | 8/2004 | Rikitake et al. |
| 2005/0232263 A1 | 10/2005 | Sagara |
| 2007/0127367 A1 | 6/2007 | Ogasahara et al. |
| 2007/0274227 A1 | 11/2007 | Rauscher et al. |
| 2007/0294562 A1 | 12/2007 | Takamatsu et al. |
| 2008/0225731 A1 | 9/2008 | Mori et al. |
| 2008/0273472 A1 | 11/2008 | Bashford et al. |
| 2009/0168771 A1 | 7/2009 | Yamazaki |
| 2010/0088552 A1 | 4/2010 | Kim et al. |
| 2010/0128611 A1 | 5/2010 | Deguchi |
| 2010/0165376 A1 | 7/2010 | Matsuyama |
| 2010/0195489 A1 | 8/2010 | Zhou et al. |
| 2010/0208595 A1 | 8/2010 | Zhao et al. |
| 2010/0325477 A1 | 12/2010 | Takamoto |
| 2011/0179188 A1 | 7/2011 | Nakagawa et al. |

FOREIGN PATENT DOCUMENTS

| | | |
|---|---|---|
| JP | 8-286920 A | 11/1996 |
| JP | 11-212959 A | 8/1999 |
| JP | 2000-48003 A | 2/2000 |
| JP | 2002-215476 A | 8/2002 |
| JP | 2005-244405 A | 9/2005 |
| JP | 3740982 B2 | 2/2006 |
| JP | 2006-332787 A | 12/2006 |
| JP | 2009-159322 A | 7/2009 |
| WO | WO 2005/048540 A1 | 5/2005 |

OTHER PUBLICATIONS

United States Office Action dated Oct. 4, 2013, in U.S. Appl. No. 12/998,758.

United States Office Action dated Mar. 27, 2013, in U.S. Appl. No. 12/998,758.

Japanese Office Action for Japanese Application No. 2010-541284 dated May 31, 2013, with partial English translation.

Japanese Office Action dated May 31, 2013, with partial English translation.

U.S. Notice of Allowance dated Dec. 16, 2013, for U.S. Appl. No. 12/998,758.

* cited by examiner

100:COMMUNICATION NETWORK MANAGEMENT SYSTEM

Fig. 4

TPL: TOPOLOGY TABLE

| SOURCE SWITCH | SOURCE PORT | DESTINATION SWITCH | DESTINATION PORT | STATUS |
|---|---|---|---|---|
| 2 | 27 | 4 | 47 | 1 |
| 2 | 28 | 5 | 58 | 1 |
| 2 | 29 | 3 | 37 | 1 |
| 3 | 37 | 2 | 29 | 1 |
| 3 | 39 | 5 | 59 | 1 |
| 4 | 47 | 2 | 27 | 1 |
| 4 | 49 | 5 | 57 | 1 |
| 5 | 57 | 4 | 49 | 1 |
| 5 | 58 | 2 | 28 | 1 |
| 5 | 59 | 3 | 39 | 1 |

Fig. 6

RTE:ROUTE TABLE

| Route ID | STOPOVER SWITCH | FORWARD ORDER | BACKWARD ORDER | FORWARD STATUS | BACKWARD STATUS |
|---|---|---|---|---|---|
| 00 | 2 | 1 | 6 | 0 | 0 |
| 00 | 4 | 2 | 5 | 0 | 0 |
| 00 | 5 | 3 | 4 | 0 | 0 |
| 00 | 2 | 4 | 3 | 0 | 0 |
| 00 | 3 | 5 | 2 | 0 | 0 |
| 00 | 5 | 6 | 1 | 0 | 0 |

Fig. 7

FRA: FORWARD CHECK FRAME

| MAC DA | MAC SA | Route ID | FORWARD ORDER |
|---|---|---|---|
| 00-00-4c-00-aa-00 | 00-00-4c-00-12-34 | 00 | i |

Fig. 8

FRB: BACKWARD CHECK FRAME

| MAC DA | MAC SA | Route ID | BACKWARD ORDER |
|---|---|---|---|
| 00-00-4c-00-aa-01 | 00-00-4c-00-12-34 | 00 | j |

Fig. 9

22: FORWARDING TABLE

| INPUT PORT | MAC DA | MAC SA | OUTPUT PORT |
|---|---|---|---|
| HOST | 00-00-4c-00-aa-00 | 00-00-4c-00-12-34 | 27 |
| 28 | 00-00-4c-00-aa-00 | 00-00-4c-00-12-34 | 29 |
| 29 | 00-00-4c-00-aa-01 | 00-00-4c-00-12-34 | 28 |
| 27 | 00-00-4c-00-aa-01 | 00-00-4c-00-12-34 | HOST |

Fig. 10

32: FORWARDING TABLE

| INPUT PORT | MAC DA | MAC SA | OUTPUT PORT |
|---|---|---|---|
| 37 | 00-00-4c-00-aa-00 | 00-00-4c-00-12-34 | 39 |
| 39 | 00-00-4c-00-aa-01 | 00-00-4c-00-12-34 | 37 |

Fig. 11

42: FORWARDING TABLE

| INPUT PORT | MAC DA | MAC SA | OUTPUT PORT |
|---|---|---|---|
| 47 | 00-00-4c-00-aa-00 | 00-00-4c-00-12-34 | 49 |
| 49 | 00-00-4c-00-aa-01 | 00-00-4c-00-12-34 | 47 |

Fig. 12

52: FORWARDING TABLE

| INPUT PORT | MAC DA | MAC SA | OUTPUT PORT |
|---|---|---|---|
| 57 | 00-00-4c-00-aa-00 | 00-00-4c-00-12-34 | 58 |
| 59 | 00-00-4c-00-aa-00 | 00-00-4c-00-12-34 | HOST |
| HOST | 00-00-4c-00-aa-01 | 00-00-4c-00-12-34 | 59 |
| 58 | 00-00-4c-00-aa-01 | 00-00-4c-00-12-34 | 57 |

Fig. 16

22: FORWARDING TABLE

| INPUT PORT | MAC DA | MAC SA | OUTPUT PORT |
|---|---|---|---|
| HOST | 00-00-4c-00-aa-00 | 00-00-4c-00-12-34 | 27, HOST |
| 28 | 00-00-4c-00-aa-00 | 00-00-4c-00-12-34 | 29, HOST |
| 29 | 00-00-4c-00-aa-01 | 00-00-4c-00-12-34 | 28, HOST |
| 27 | 00-00-4c-00-aa-01 | 00-00-4c-00-12-34 | HOST |

Fig. 17

32: FORWARDING TABLE

| INPUT PORT | MAC DA | MAC SA | OUTPUT PORT |
|---|---|---|---|
| 37 | 00-00-4c-00-aa-00 | 00-00-4c-00-12-34 | 39. HOST |
| 39 | 00-00-4c-00-aa-01 | 00-00-4c-00-12-34 | 37. HOST |

Fig. 18

42: FORWARDING TABLE

| INPUT PORT | MAC DA | MAC SA | OUTPUT PORT |
|---|---|---|---|
| 47 | 00-00-4c-00-aa-00 | 00-00-4c-00-12-34 | 49. HOST |
| 49 | 00-00-4c-00-aa-01 | 00-00-4c-00-12-34 | 47. HOST |

Fig. 19

52:FORWARDING TABLE

| INPUT PORT | MAC DA | MAC SA | OUTPUT PORT |
|---|---|---|---|
| 57 | 00-00-4c-00-aa-00 | 00-00-4c-00-12-34 | 58, HOST |
| 59 | 00-00-4c-00-aa-00 | 00-00-4c-00-12-34 | HOST |
| HOST | 00-00-4c-00-aa-01 | 00-00-4c-00-12-34 | 59, HOST |
| 58 | 00-00-4c-00-aa-01 | 00-00-4c-00-12-34 | 57, HOST |

Fig. 20

RTE: ROUTE TABLE

| Route ID | STOPOVER SWITCH | FORWARD ORDER | BACKWARD ORDER | FORWARD STATUS | BACKWARD STATUS |
|---|---|---|---|---|---|
| 00 | 2 | 1 | 6 | 1 | 0 |
| 00 | 4 | 2 | 5 | 1 | 0 |
| 00 | 5 | 3 | 4 | 0 | 1 |
| 00 | 2 | 4 | 3 | 0 | 1 |
| 00 | 3 | 5 | 2 | 0 | 1 |
| 00 | 5 | 6 | 1 | 0 | 1 |

Fig. 21

TPL: TOPOLOGY TABLE

| SOURCE SWITCH | SOURCE PORT | DESTINATION SWITCH | DESTINATION PORT | STATUS |
|---|---|---|---|---|
| 2 | 27 | 4 | 47 | 1 |
| 2 | 28 | 5 | 58 | 1 |
| 2 | 29 | 3 | 37 | 1 |
| 3 | 37 | 2 | 29 | 1 |
| 3 | 39 | 5 | 59 | 1 |
| 4 | 47 | 2 | 27 | 1 |
| 4 | 49 | 5 | 57 | 0 |
| 5 | 57 | 4 | 49 | 0 |
| 5 | 58 | 2 | 28 | 1 |
| 5 | 59 | 3 | 39 | 1 |

Fig. 27

42: FORWARDING TABLE

| INPUT PORT | MAC DA | MAC SA | OUTPUT PORT |
|---|---|---|---|
| 47 | 00-00-4c-00-aa-00 | 00-00-4c-00-12-34 | 49, HOST |
| 49 | 00-00-4c-00-aa-01 | 00-00-4c-00-12-34 | 47, HOST |
| HOST | 00-00-4c-00-aa-01 | 00-00-4c-00-12-34 | 47, HOST |

Fig. 28

52: FORWARDING TABLE

| INPUT PORT | MAC DA | MAC SA | OUTPUT PORT |
|---|---|---|---|
| 57 | 00-00-4c-00-aa-00 | 00-00-4c-00-12-34 | 58. HOST |
| 59 | 00-00-4c-00-aa-00 | 00-00-4c-00-12-34 | HOST |
| HOST | 00-00-4c-00-aa-01 | 00-00-4c-00-12-34 | 59. HOST |
| 58 | 00-00-4c-00-aa-01 | 00-00-4c-00-12-34 | 57. HOST |
| HOST | 00-00-4c-00-aa-00 | 00-00-4c-00-12-34 | 58. HOST |

Fig. 29

RTE: ROUTE TABLE

| Route ID | STOPOVER SWITCH | FORWARD ORDER | BACKWARD ORDER | FORWARD STATUS | BACKWARD STATUS |
|---|---|---|---|---|---|
| 00 | 2 | 1 | 6 | 1 | 1 |
| 00 | 4 | 2 | 5 | 1 | 0 |
| 00 | 5 | 3 | 4 | 0 | 1 |
| 00 | 2 | 4 | 3 | 1 | 1 |
| 00 | 3 | 5 | 2 | 1 | 1 |
| 00 | 5 | 6 | 1 | 1 | 1 |

Fig. 31

RTE: ROUTE TABLE

| Route ID | STOPOVER SWITCH | FORWARD ORDER | FORWARD STATUS |
|---|---|---|---|
| 00 | 2 | 1 | 0 |
| 00 | 4 | 2 | 0 |
| 00 | 5 | 3 | 0 |
| 00 | 2 | 4 | 0 |
| 00 | 3 | 5 | 0 |
| 00 | 5 | 6 | 0 |
| 00 | 2 | 3 | 0 |
| 00 | 4 | 4 | 0 |
| 00 | 5 | 5 | 0 |
| 00 | 2 | 6 | 0 |
| 00 | 3 | 7 | 0 |

Fig. 33

22: FORWARDING TABLE

| INPUT PORT | MAC DA | MAC SA | OUTPUT PORT |
|---|---|---|---|
| HOST | 00-00-4c-00-aa-00 | 00-00-4c-00-12-34 | 27, HOST |
| 28 | 00-00-4c-00-aa-00 | 00-00-4c-00-12-34 | 28, 29, HOST |
| 29 | 00-00-4c-00-aa-00 | 00-00-4c-00-12-34 | HOST |
| 27 | 00-00-4c-00-aa-00 | 00-00-4c-00-12-34 | HOST |

Fig. 34

32: FORWARDING TABLE

| INPUT PORT | MAC DA | MAC SA | OUTPUT PORT |
|---|---|---|---|
| 37 | 00-00-4c-00-aa-00 | 00-00-4c-00-12-34 | 37, 39, HOST |
| 39 | 00-00-4c-00-aa-00 | 00-00-4c-00-12-34 | HOST |

Fig. 35

42: FORWARDING TABLE

| INPUT PORT | MAC DA | MAC SA | OUTPUT PORT |
|---|---|---|---|
| 47 | 00-00-4c-00-aa-00 | 00-00-4c-00-12-34 | 47, 49, HOST |
| 49 | 00-00-4c-00-aa-00 | 00-00-4c-00-12-34 | HOST |

Fig. 36

52: FORWARDING TABLE

| INPUT PORT | MAC DA | MAC SA | OUTPUT PORT |
|---|---|---|---|
| 57 | 00-00-4c-00-aa-00 | 00-00-4c-00-12-34 | 57, 58, HOST |
| 59 | 00-00-4c-00-aa-00 | 00-00-4c-00-12-34 | 59, HOST |
| 58 | 00-00-4c-00-aa-00 | 00-00-4c-00-12-34 | HOST |

Fig. 37

RTE: ROUTE TABLE

| Route ID | STOPOVER SWITCH | FORWARD ORDER | FORWARD STATUS |
|---|---|---|---|
| 00 | 2 | 1 | 1 |
| 00 | 4 | 2 | 1 |
| 00 | 5 | 3 | 0 |
| 00 | 2 | 4 | 0 |
| 00 | 3 | 5 | 0 |
| 00 | 5 | 6 | 0 |
| 00 | 2 | 3 | 1 |
| 00 | 4 | 4 | 0 |
| 00 | 5 | 5 | 0 |
| 00 | 2 | 6 | 0 |
| 00 | 3 | 7 | 0 |

Fig. 38

52:FORWARDING TABLE

| INPUT PORT | MAC DA | MAC SA | OUTPUT PORT |
|---|---|---|---|
| 57 | 00-00-4c-00-aa-00 | 00-00-4c-00-12-34 | 57, 58, HOST |
| 59 | 00-00-4c-00-aa-00 | 00-00-4c-00-12-34 | 59, HOST |
| 58 | 00-00-4c-00-aa-00 | 00-00-4c-00-12-34 | HOST |
| HOST | 00-00-4c-00-aa-00 | 00-00-4c-00-12-34 | 57, 58, HOST |

Fig. 39

RTE: ROUTE TABLE

| Route ID | STOPOVER SWITCH | FORWARD ORDER | FORWARD STATUS |
|---|---|---|---|
| 00 | 2 | 1 | 1 |
| 00 | 4 | 2 | 1 |
| 00 | 5 | 3 | 0 |
| 00 | 2 | 4 | 1 |
| 00 | 3 | 5 | 1 |
| 00 | 5 | 6 | 1 |
| 00 | 2 | 3 | 1 |
| 00 | 4 | 4 | 0 |
| 00 | 5 | 5 | 1 |
| 00 | 2 | 6 | 1 |
| 00 | 3 | 7 | 1 |

COMMUNICATION NETWORK MANAGEMENT SYSTEM, METHOD AND PROGRAM, AND MANAGEMENT COMPUTER

TECHNICAL FIELD

The present invention relates to a communication network management technique that performs centralized management of a communication network by using a management computer.

BACKGROUND ART

In recent years, a communication network has a significant role as a social infrastructure that provides various services, and failure of the communication network has an incalculable impact on users. Therefore, health-checking of the communication network has become a very important issue.

Patent Literature 1 (International Publication WO2005/048540) discloses a technique that uses a keep-alive frame to detect a failure in a communication network. More specifically, in a communication system in which a plurality of base nodes perform communication through one or more relay node, each base node transmits a keep-alive frame that is broadcasted by the relay node. Here, the plurality of base nodes mutually transmit and receive the keep-alive frame and detect failure by monitoring arrival state of the keep-alive frame transmitted from the other side node. In this case, in order to health-check all physical links in the communication network, it is necessary to configure a plurality of communication routes so as to cover all the physical links and to transmit and receive the keep-alive frame with respect to each communication route. That is, it is required to transmit and receive a large number of keep-alive frames. This causes increase in transmission and reception burden placed on each base node.

Non-Patent Literature 1 (S. Shah and M. Yip, "Extreme Networks' Ethernet Automatic Protection Switching (EAPS) Version 1", The Internet Society, October 2003; (http://tools.ietf.org/html/rfc3619).) discloses a health-check technique in a communication network that is configured in a ring shape. In this case, a plurality of switches are connected through communication lines to form a ring shape, and one health-check frame is transferred sequentially along the ring. For example, a master switch on the ring transmits the health-check frame from a first port. Another switch forwards the received health-check frame to the next switch. The master switch receives the self-transmitted health-check frame at a second port, and thereby can confirm that no failure occurs. This technique assumes such a ring-shaped network structure and thus is not versatile.

Patent Literature 2 (Japanese Patent No. 3740982) discloses a technique that a management host computer performs health-check of a plurality of host computers. First, the management host computer determines an order of the health-check for the plurality of host computers. Next, the management host computer generates a health-check packet into which a health-check table is incorporated. The health-check table has a plurality of entries respectively related to the plurality of host computers, and the plurality of entries are arranged in the above determined order. Each entry includes an address of the related host computer and a check flag. Then, the management host computer transmits the health-check packet to a first host computer. A host computer that receives the health-check packet searches for the related entry in the health-check table and marks the check flag of the corresponding entry. After that, the host computer refers to the address in the next entry and transmits the health-check packet to the next host computer. Due to repetition of the above-mentioned processing, one health-check packet travels the host computers. Eventually, the management host computer receives the health-check packet that has traveled in this manner. Then, the management host computer determines that a failure occurs in a host computer the corresponding check flag of which is not marked.

According to Patent Literature 3 (Japanese Patent Publication JP-2006-332787), one health-check packet travels a plurality of monitor-target terminals, as in the case of Patent Literature 2. A similar health-check table is incorporated into the health-check packet. However, each entry includes, instead of the above-mentioned check flag, a check list in which such information as a date and time and an operating status is to be written. A monitoring terminal transmits the health-check packet to a first monitor-target terminal. When receiving the health-check packet, the monitor-target terminal judges whether or not itself is operating normally. In a case of a normal operation, the monitor-target terminal searches for the related entry in the health-check table and writes designated information such as the date and time and the operating status in the check list of the corresponding entry. Then, the monitor-target terminal refers to the address in the next entry and transmits the health-check packet to the next monitor-target terminal. Here, if communication with the next monitor-target terminal is impossible, the monitor-target terminal transmits the health-check packet to the monitor-target terminal after the next monitor-target terminal. Due to repetition of the above-mentioned processing, one health-check packet travels the monitor-target terminals. Eventually, the monitoring terminal receives the health-check packet that has traveled in this manner. If the designated information is not written in any check list, the monitoring terminal determines that a failure occurs.

It should be noted that Patent Literature 4 (Japanese Patent Publication JP-2000-48003), Patent Literature 5 (Japanese Patent Publication JP-H8-286920), Patent Literature 6 (Japanese Patent Publication JP-H11-212959) and Patent Literature 7 (Japanese Patent Publication JP-H3-191464) describe a method for solving a traveling salesman problem.

CITATION LIST

Patent Literature

[Patent Literature 1] International Publication WO2005/048540
[Patent Literature 2] Japanese Patent No. 3740982
[Patent Literature 3] Japanese Patent Publication JP-2006-332787
[Patent Literature 4] Japanese Patent Publication JP-2000-48003
[Patent Literature 5] Japanese Patent Publication JP-H8-286920
[Patent Literature 6] Japanese Patent Publication JP-H11-212959
[Patent Literature 7] Japanese Patent Publication JP-H3-191464

Non Patent Literature

[Non-Patent Literature 1] S. Shah and M. Yip, "Extreme Networks' Ethernet Automatic Protection Switching (EAPS) Version 1", The Internet Society, October 2003; (http://tools.ietf.org/html/rfc3619).

SUMMARY OF INVENTION

According to Patent Literature 3 described above, one health-check packet into which the health-check table is incorporated travels a plurality of nodes. When receiving the health-check packet, each node searches for the related entry in the health-check table and writes predetermined information such as the operating status in the corresponding entry. The predetermined information written in the health-check packet is used by the monitoring terminal for identifying location of failure. That is, the monitoring terminal performs identification of location of failure based on the predetermined information written in the health-check packet that comes back after traveling the plurality of nodes.

However, if communication between a node and the next node is not available, the traveling of the health-check packet is not achieved and thus the monitoring terminal cannot receive the health-check packet. That is, the monitoring terminal cannot perform the processing of identifying the location of failure. Therefore, a node that receives the health-check packet investigates whether or not it can communicate with the next node, before forwarding the health-check packet to the next node. More specifically, the node tries to connect a line with the next node for establishing handshake. If communication with the next node is impossible, the node searches for an available communication partner such as a node after the next node. Then, the node transmits the health-check packet to the available communication partner such as the node after the next node. However, such the processing is complicated and places overmuch burden on each node.

An object of the present invention is to provide a technique that can reduce burden placed on each node, when performing centralized management of a communication network including a plurality of nodes by using a management computer.

In an aspect of the present invention, a communication network management system is provided. The communication network management system has: a communication network including a plurality of nodes and a plurality of links connecting between the plurality of nodes; and a management computer configured to manage the communication network. The management computer has: a storage means in which a route information indicating a transfer route of frames in the communication network is stored; and a monitoring means configured to perform, based on the route information, transmission and reception of frames to and from the communication network. The monitoring means transmits a frame to the transfer route. Each of the plurality of nodes, when receiving a frame, not only forwards the received frame along the transfer route but also sends a reply to the management computer. The monitoring means identifies a location of failure occurrence on the transfer route, based on reception state of the reply from the plurality of nodes.

In another aspect of the present invention, a management computer that manages a communication network including a plurality of nodes and a plurality of links connecting between the plurality of nodes is provided. The management computer has: a storage means in which a route information indicating a transfer route of frames in the communication network is stored; an entry control means; and a monitoring means configured to perform, based on the route information, transmission and reception of frames to and from the communication network. The entry control means instructs each of the plurality of nodes to, when receiving a frame, not only forward the received frame along the transfer route but also send a replay to the management computer. The monitoring means transmits a frame to the transfer route and identifies a location of failure occurrence on the transfer route, based on reception state of the reply from the plurality of nodes.

In still another aspect of the present invention, a node in a communication network management system is provided. The communication network management system has: a communication network including a plurality of nodes and a plurality of links connecting between the plurality of nodes; and a management computer configured to manage the communication network. A frame transmitted from the management computer is transferred along a predetermined transfer route in the communication network. The node according to the present invention, when receiving a frame, not only forwards the received frame along the predetermined transfer route but also sends a reply to the management computer.

In still another aspect of the present invention, a communication network management method that manages a communication network by using a management computer is provided. The communication network includes a plurality of nodes and a plurality of links connecting between the plurality of nodes. The communication network management method includes: (A) a step of transmitting, by the management computer, a frame to a transfer route in the communication network; (B) a step of sending, by each of the plurality of nodes, when receiving a frame, a reply to the management computer as well as forwarding the received frame along the transfer route; and (C) a step of identifying, by the management computer, a location of failure occurrence on the transfer route, based on reception state of the reply from the plurality of nodes.

In still another aspect of the present invention, a management program that causes a management computer to perform management processing for a communication network is provided. The communication network includes a plurality of nodes and a plurality of links connecting between the plurality of nodes. The management processing includes: (a) a step of storing a route information indicating a transfer route of frames in the communication network in a storage device; (b) a step of instructing each of the plurality of nodes to, when receiving a frame, not only forward the received frame along the transfer route but also send a replay to the management computer; (c) a step of transmitting a frame to the transfer route based on the route information; and (d) a step of identifying a location of failure occurrence on the transfer route, based on reception state of the reply from the plurality of nodes. The management program is recorded in a computer-readable recording medium.

According to the present invention, it is possible to reduce burden placed on each node, when performing centralized management of a communication network including a plurality of nodes by using a management computer.

BRIEF DESCRIPTION OF DRAWINGS

The above and other objects, advantages and features of the present invention will be more apparent from the following description of certain exemplary embodiments taken in conjunction with the accompanying drawings.

FIG. 4 shows an example of a topology table.

FIG. 6 shows an example of a route table.

FIG. 7 is a conceptual diagram showing an example of a forward check frame.

FIG. 8 is a conceptual diagram showing an example of a backward check frame.

FIG. 9 shows the forwarding table of a switch 2.

FIG. 10 shows the forwarding table of a switch 3.

FIG. 11 shows the forwarding table of a switch 4.

FIG. 12 shows the forwarding table of a switch 5.

FIG. 16 shows the forwarding table of the switch 2 in the case of the processing shown in FIG. 15.

FIG. 17 shows the forwarding table of the switch 3 in the case of the processing shown in FIG. 15.

FIG. 18 shows the forwarding table of the switch 4 in the case of the processing shown in FIG. 15.

FIG. 19 shows the forwarding table of the switch 5 in the case of the processing shown in FIG. 15.

FIG. 20 shows the route table in the case of the processing shown in FIG. 15.

FIG. 21 shows the topology table in the case of the processing shown in FIG. 15.

FIG. 27 shows the forwarding table of the switch 4 in the case of the processing shown in FIG. 26.

FIG. 28 shows the forwarding table of the switch 5 in the case of the processing shown in FIG. 26.

FIG. 29 shows the route table in the case of the processing shown in FIG. 26.

FIG. 31 shows an example of the route table in the fourth exemplary embodiment.

FIG. 33 shows the forwarding table of the switch 2 in the case of the processing shown in FIG. 32.

FIG. 34 shows the forwarding table of the switch 3 in the case of the processing shown in FIG. 32.

FIG. 35 shows the forwarding table of the switch 4 in the case of the processing shown in FIG. 32.

FIG. 36 shows the forwarding table of the switch 5 in the case of the processing shown in FIG. 32.

FIG. 37 shows the route table in the case of the processing shown in FIG. 32.

FIG. 38 shows the forwarding table of the switch 5 in the case of the processing shown in FIG. 32.

FIG. 39 shows the route table in the case of the processing shown in FIG. 32.

DESCRIPTION OF EMBODIMENTS

Figure 1:
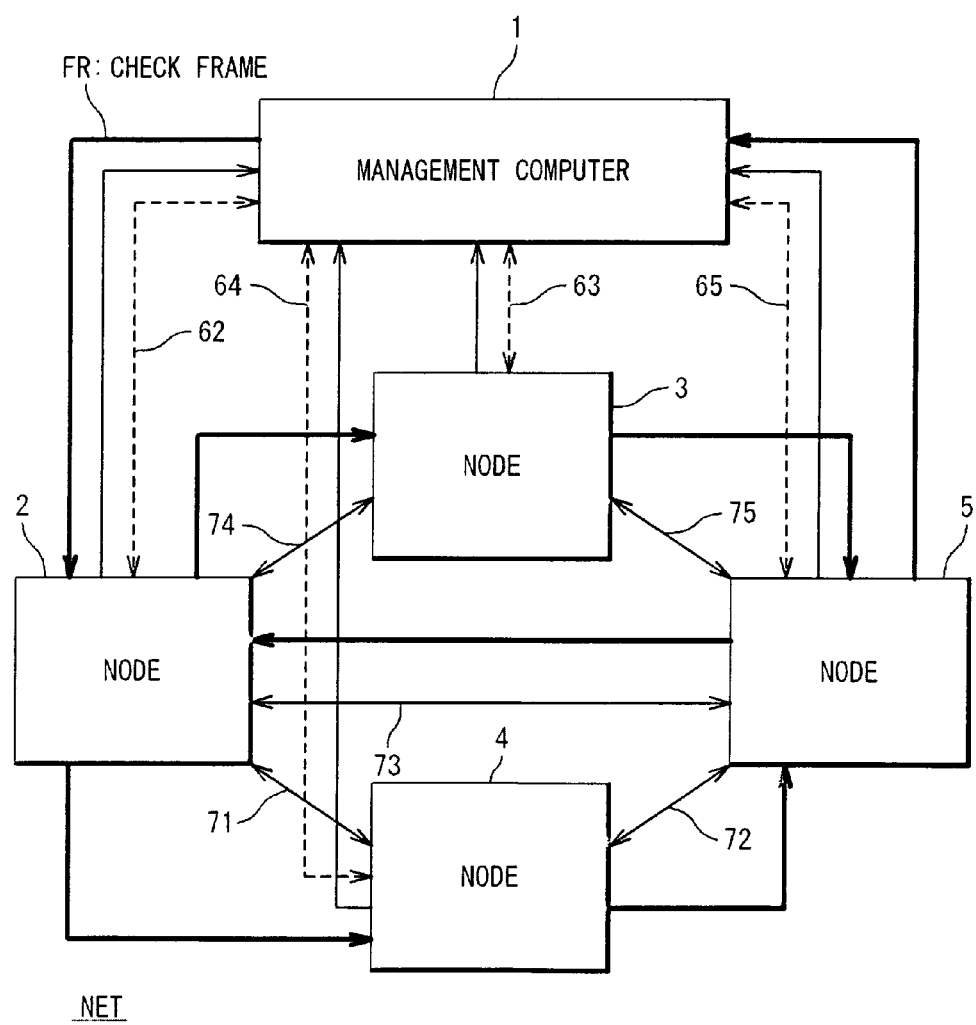
FIG. 1 schematically shows a communication network management system according to an exemplary embodiment of the present invention.

FIG. 1 schematically shows a communication network management system 100 according to an exemplary embodiment of the present invention. In the communication network management system 100 according to the present exemplary embodiment, centralized management of a communication network is performed by a management computer. That is, the communication network management system 100 is provided with a communication network NET and a management computer 1 that manages the communication network NET, as shown in FIG. 1.

The communication network NET includes a plurality of nodes 2 to 5 and a plurality of physical links 71 to 75 connecting between the nodes 2 to 5. The physical link 71 is a signal line that bi-directionally connects the node 2 and the node 4. The node 2 and the node 4 can communicate bi-directionally through the physical link 71. The physical link 72 is a signal line that bi-directionally connects the node 4 and the node 5. The node 4 and the node 5 can communicate bi-directionally through the physical link 72. The physical link 73 is a signal line that bi-directionally connects the node 5 and the node 2. The node 5 and the node 2 can communicate bi-directionally through the physical link 73. The physical link 74 is a signal line that bi-directionally connects the node 2 and the node 3. The node 2 and the node 3 can communicate bi-directionally through the physical link 74. The physical link 75 is a signal line that bi-directionally connects the node 3 and the node 5. The node 3 and the node 5 can communicate bi-directionally through the physical link 75.

A control link 62 is a signal line that bi-directionally connects the management computer 1 and the node 2. A control link 63 is a signal line that bi-directionally connects the management computer 1 and the node 3. A control link 64 is a signal line that bi-directionally connects the management computer 1 and the node 4. A control link 65 is a signal line that bi-directionally connects the management computer 1 and the node 5. The management computer 1 and the nodes 2 to 5 can communicate bi-directionally through the control links 62 to 65, respectively.

The management computer 1 transmits a frame for health-check (hereinafter referred to as a "check frame FR") to the communication network NET. The check frame FR on the communication network NET travels the nodes 2 to 5 along a transfer route. The transfer route (travel route) of the check frame FR may be determined by the management computer 1. Alternatively, the transfer route of the check frame FR may be fixed. As an example, a transfer route along which the check frame FR travels in an order of "node 2-4-5-2-3-5" is shown in FIG. 1.

In this case, the management computer 1 transmits a check frame FR to the node 2 (start-point node) through the control link 62. The node 2 forwards the check frame FR received from the management computer 1 to the node 4. The node 4 forwards the check frame FR received from the node 2 to the node 5. The node 5 forwards the check frame FR received from the node 4 to the node 2. The node 2 forwards the check frame FR received from the node 5 to the node 3. The node 3 forwards the check frame FR received from the node 2 to the node 5. The node 5 (end-point node) forwards the check frame FR received from the node 3 to the management computer 1. In this manner, each node, when receiving the check frame FR, forwards the received check frame FR along the transfer route. Thereby, the traveling of the check frame FR along the transfer route is achieved.

Here, let us consider a situation where a failure occurs on the transfer route of the check frame FR. According to the present exemplary embodiment, at least in this situation, each node operates as follows. That is, each node, when receiving the check frame FR, not only forwards the received check frame FR along the transfer route but also sends a "reply" acknowledging receipt of the check frame FR to the management computer 1. The reply may be a reception notification signal acknowledging the receipt or may be a copy of the received check frame FR.

After transmitting the check frame FR to the start-point node 2, the management computer 1 receives the reply from each node. If a failure is occurring on the transfer route, the management computer 1 receives the reply from some nodes but does not receive the reply from the other nodes. Therefore, the management computer 1 can identify a location of failure occurrence on the transfer route, based on reception state of the reply from the plurality of nodes 2 to 5 on the transfer route. As an example, let us consider a case where a bi-directional failure is occurring between the node 4 and the node 5. When the transfer route is "node 2-4-5-2-3-5" as shown in FIG. 1, the management computer 1 receives the reply from the first nodes 2 and 4 but does not receive the reply from the subsequent nodes. Therefore, the management computer 1 can determine that a failure is occurring between the node 4 from which the reply is last received and the next node 5.

According to the present exemplary embodiment, as described above, it is possible to identify the location of failure on the predetermined transfer route by a simple processing. The reason is that the node receiving the check frame FR not only forwards the received check frame FR along the transfer route but also sends the reply to the management computer 1. The management computer 1 can easily identify the location of failure on the transfer route, based on reception state of the reply from the plurality of nodes on the transfer route. The complicated processing such as required in Patent Literature 2 or Patent Literature 3 is not necessary for identifying the location of failure. For example, such processing as described in Patent Literature 3 that each node investigates whether or not it can communicate with the next node is not necessary. As a result, burden placed on each switch is reduced.

The present invention can be applied to health-check of nodes and physical links on a LAN of companies, data centers, universities and the like and health-check of communication equipments and physical links of telecommunication carriers.

Hereinafter, various exemplary embodiments of the present invention will be described in more detail. Various methods are possible as a method for achieving the traveling of the check frame FR along a predetermined transfer route in the communication network NET. In the following description, for example, each node is provided with a "forwarding table" in order to achieve the traveling of the check frame FR. The forwarding table is a table that indicates a correspondence relationship between input sources and forwarding destinations of the check frames FR. Each node can forward the check frame FR received from an input source to a designated forwarding destination, by referring to the forwarding table.

Contents of the forwarding table of each node are set up by each node in accordance with an instruction from the management computer 1. More specifically, the management computer 1 uses the control link (62, 63, 64, 65) to instruct each node (2, 3, 4, 5) to set up the forwarding table. Here, the management computer 1 instructs each node to set up the forwarding table such that the check frames FR are forwarded along the above-mentioned transfer route. Each node sets up the contents of the forwarding table in accordance with the instruction from the management computer 1.

Various interfaces are possible as an interface between the management computer and the nodes for achieving the processing described above. For example, Openflow (refer to http://www.openflowswitch.org/) is applicable. In this case, an "Openflow Controller" serves as the management computer 1 and an "Openflow Switch" serves as each of the nodes 2 to 5. It is possible to set up the forwarding table by using "Secure Channel" of the Openflow. Alternatively, GMPLS (Generalized Multi-Protocol Label Switching) also is applicable. In this case, the management computer instructs a GMPLS switch to set up the forwarding table. Alternatively, VLAN (Virtual LAN) also is applicable. In this case, the management computer can control VLAN setting of each switch by using an MIB (Management Information Base) interface.

In the following description, the health-check of the communication network NET by the use of the check frame FR will be described. Here, let us consider a case where the above-mentioned Openflow is used as the interface between the management computer and the nodes. In this case, an "Openflow Controller" serves as the management computer 1 and an "Openflow Switch" serves as each of the nodes 2 to 5.

1. First Exemplary Embodiment 1-1. Configuration

Figure 2:
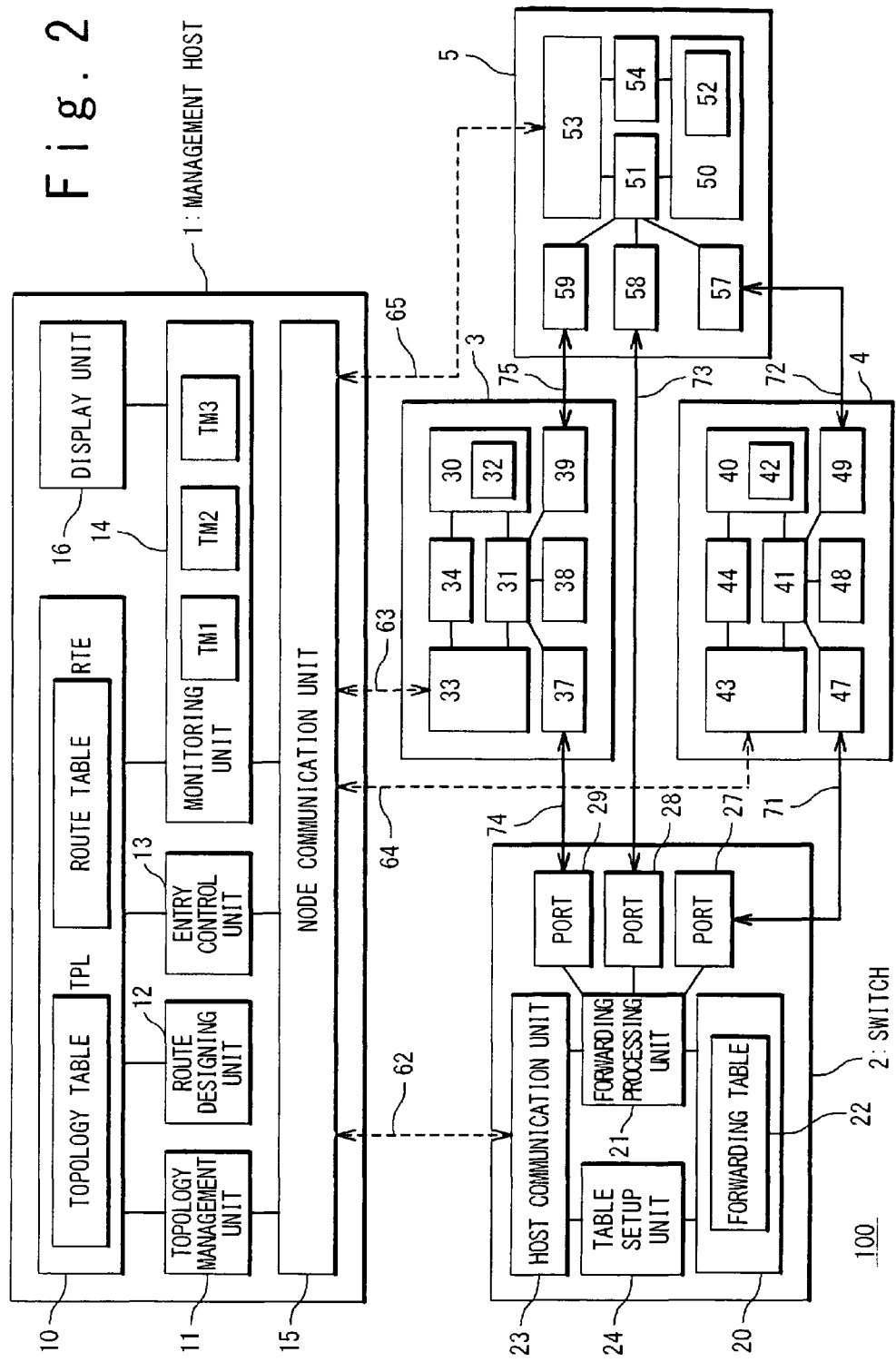
FIG. 2 is a block diagram showing a configuration of the communication network management system according to an exemplary embodiment of the present invention.

FIG. 2 is a block diagram showing a configuration of the communication network management system 1 according to the first exemplary embodiment. A management host 1 (Openflow Controller) in FIG. 2 corresponds to the management computer 1 in FIG. 1. Switches 2 to 5 (Openflow Switch) in FIG. 2 correspond to the nodes 2 to 5 in FIG. 1, respectively.

The management host 1 has a storage unit 10, a topology management unit 11, a route designing unit 12, an entry control unit 13, a monitoring unit 14, a node communication unit 15 and a display unit 16. The node communication unit 15 is connected to the switches 2 to 5 through the control links 62 to 65, respectively. The management host 1 can communicate bi-directionally with the switches 2 to 5 by using the node communication unit 15 and the control links 62 to 65.

The storage unit 10 is a storage device such as a RAM and an HDD. A topology table TPL and a route table RTE are stored in the storage unit 10. The topology table TPL (topology information) indicates the above-mentioned physical topology of the communication network NET, namely, a connection relationship between the switches 2 to 5. The route table RTE (route information) indicates the transfer route of the check frames FR in the communication network NET.

The topology management unit 11 creates the topology table TPL and stores it in the storage unit 10. Moreover, the topology management unit 11 receives from the node communication unit 15 a topology change notification that is transmitted from each switch. Here, the topology change notification is information indicating change in the physical topology of the communication network NET and includes new switch connection information, up-down notification of a physical link and so forth. The topology management unit 11 updates the topology table TPL in accordance with the received topology change notification.

The route designing unit 12 refers to the topology table TPL stored in the storage unit 10 to determine (design) the transfer route of the check frame FR in the communication network NET. Then, the route designing unit 12 stores the route table RTE indicating the determined transfer route in the storage unit 10.

The entry control unit 13 instructs each switch (2, 3, 4, 5) to set up the forwarding table (22, 32, 42, 52). More specifically, the entry control unit 13 refers to the topology table TPL and the route table RTE stored in the storage unit 10. Then, the entry control unit 13 instructs each switch (2, 3, 4, 5) to set up the forwarding table (22, 32, 42, 52) such that the check frames FR are forwarded along the transfer route indicated by the route table RTE. The entry control unit 13 transmits a table setup command indicating the instruction to each switch (2, 3, 4, 5) through the node communication unit 15 and the control links (62, 63, 64, 65).

The monitoring unit 14 performs, based on the route table RTE stored in the storage unit 10, transmission and reception of the check frames FR to and from the communication network NET. The transmission and reception of the check frame FR to and from the switch 2 is performed through the node communication unit 15 and the control link 62. The transmission and reception of the check frame FR to and from the switch 3 is performed through the node communication unit 15 and the control link 63. The transmission and reception of the check frame FR to and from the switch 4 is performed through the node communication unit 15 and the control link 64. The transmission and reception of the check frame FR to and from the switch 5 is performed through the node communication unit 15 and the control link 65. Moreover, as will be described later in detail, the monitoring unit 14 carried out, based on reception state of the check frames FR from each switch, detection of failure occurrence and identification of location of failure in the communication network NET.

It should be noted that the topology management unit 11, the route designing unit 12, the entry control unit 13 and the monitoring unit 14 described above can be realized by a processor executing a computer program.

The display unit 16 is a display device such as a liquid crystal display device. The display unit 16 displays various information. For example, the display unit 16 displays the connection state between the switches indicated by the topology table TPL and a state of failure occurrence that will be described below.

The switch 2 has a table storage unit 20, a forwarding processing unit 21, a host communication unit 23, a table setup unit 24, a port 27, a port 28 and a port 29. The host communication unit 23 corresponds to the "Secure Channel" of the "Openflow Switch". The host communication unit 23 is connected to the management host 1 through the control link 62, and the switch 2 can communicate bi-directionally with the management host 1 by using the host communication unit 23 and the control link 62. Moreover, each port (communication interface) is connected to another switch through the physical link, and the switch 2 can communicate bi-directionally with another switch by using the port and the physical link.

The table storage unit 20 is a storage device such as a RAM and an HDD. The above-mentioned forwarding table 22 that indicates a correspondence relationship between input sources and forwarding destinations of the check frames FR is stored in the table storage unit 20.

The forwarding processing unit 21 receives the check frame FR from the host communication unit 23 (i.e. management host 1). Alternatively, the forwarding processing unit 21 receives the check frame FR from any port (i.e. another switch). Then, by referring to the forwarding table 22 stored in the table storage unit 20, the forwarding processing unit 2 forwards the check frame FR received from an input source to a forwarding destination (host communication unit 23 or port) designated by the forwarding table 22. In a case where a plurality of forwarding destinations are designated, the forwarding processing unit 21 copies the check frame FR and forwards them respectively to the plurality of forwarding destinations.

The table setup unit 24 receives from the host communication unit 23 the above-mentioned table setup command transmitted from the management host 1. Then, in accordance with the table setup command, the table setup unit 24 sets (add, delete, change) the contents of the forwarding table 22 stored in the table storage unit 20.

It should be noted that the forwarding processing unit 21, the host communication unit 23 and the table setup unit 24 described above can be realized by a processor executing a computer program.

Other switches 3 to 5 each has a similar configuration to that of the switch 2. That is, the switch 3 has a table storage unit 30, a forwarding processing unit 31, a host communication unit 33, a table setup unit 34, a port 37, a port 38 and a port 39. A forwarding table 32 is stored in the table storage unit 30. The switch 4 has a table storage unit 40, a forwarding processing unit 41, a host communication unit 43, a table setup unit 44, a port 47, a port 48 and a port 49. A forwarding table 42 is stored in the table storage unit 40. The switch 5 has a table storage unit 50, a forwarding processing unit 51, a host communication unit 53, a table setup unit 54, a port 57, a port 58 and a port 59. A forwarding table 52 is stored in the table storage unit 50. Each component and processing are the same as in the case of the switch 2, and description thereof is omitted.

In the example shown in FIG. 2, the physical topology of the communication network NET, namely, the connection relationship between the switches 2 to 5 is as follows. The port 27 of the switch 2 and the port 47 of the switch 4 are connected bi-directionally through the physical link 71. The port 49 of the switch 4 and the port 57 of the switch 5 are connected bi-directionally through the physical link 72. The port 58 of the switch 5 and the port 28 of the switch 2 are connected bi-directionally through the physical link 73. The port 29 of the switch 2 and the port 37 of the switch 3 are connected bi-directionally through the physical link 74. The port 39 of the switch 3 and the port 59 of the switch 5 are connected bi-directionally through the physical link 75.

1-2. Processing

Figure 3:
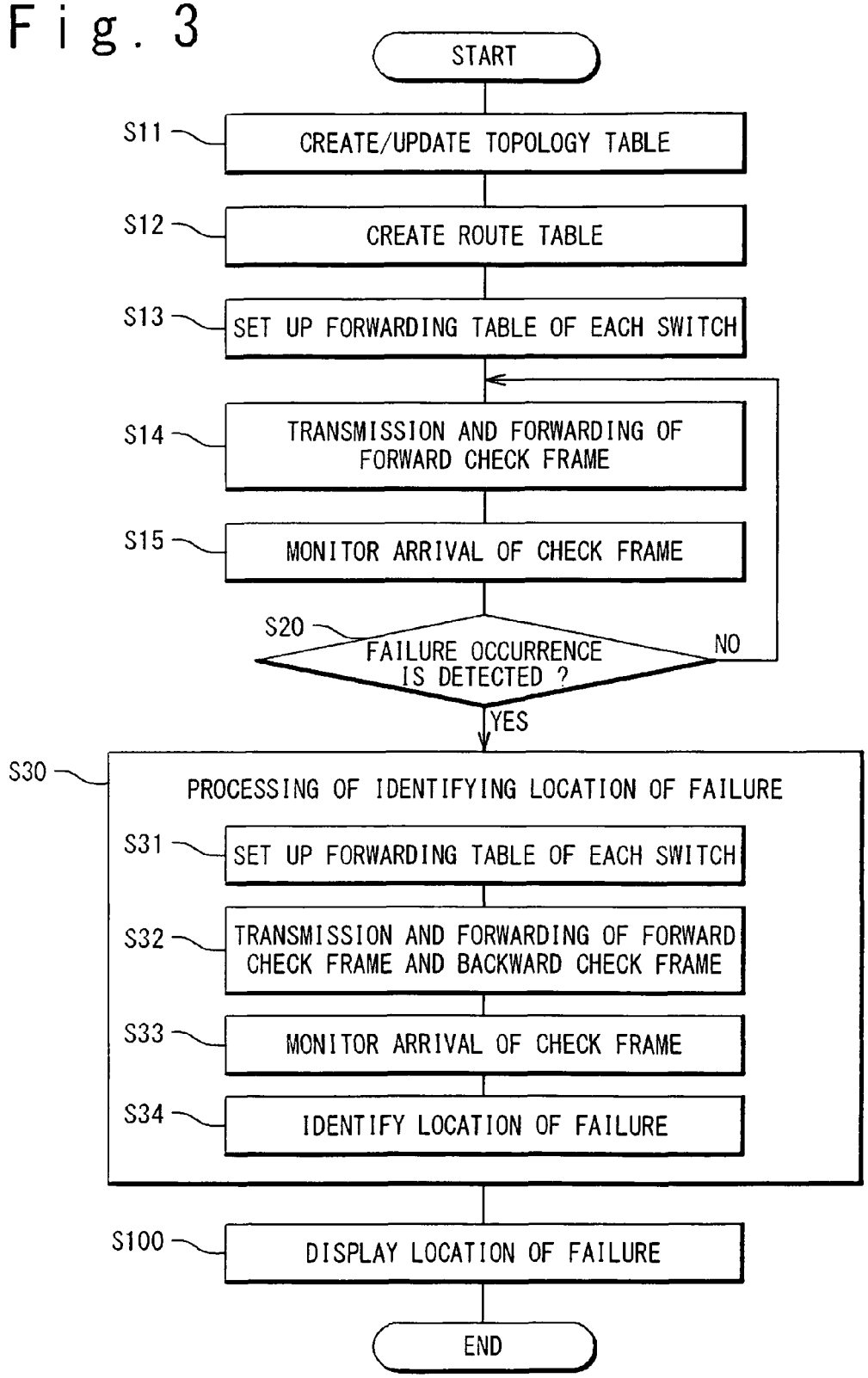
FIG. 3 is a flow chart showing a communication network management method according to a first exemplary embodiment of the present invention.

FIG. 3 is a flow chart showing a communication network management method according to the present exemplary embodiment. The communication network management processing according to the present exemplary embodiment will be described in detail with reference to FIGS. 2 and 3 as appropriate. It should be noted that management processing by the management host 1 is realized by the management host 1 executing a management program. Also, frame forwarding processing by each node is realized by the each node executing the frame forwarding program.

Step S11:

The topology management unit 11 creates the topology table TPL and stores it in the storage unit 10. Moreover, the topology management unit 11 receives the topology change notification from each switch and updates the topology table TPL in accordance with the topology change notification.

Here, let us consider a case where the physical topology of the communication network NET is as shown in FIG. 2. FIG. 4 shows an example of the topology table TPL in that case. The topology table TPL has a plurality of entries that are respectively related to a plurality of physical links 71 to 75. In the case where the physical link is bi-directional, the entry is created with respect to each direction. Each entry indicates a source switch, a source port, a destination switch, a destination port and a status flag with regard to the related physical link. The source switch is a switch as a start-point of the physical link, and the source port is a port of the source switch. The destination switch is a switch as an end-point of the physical link, and the destination port is a port of the destination switch. For example, the first entry "source switch=2, source port=27, destination switch=4, destination port=47" in FIG. 4 is related to the physical link 71 from the switch 2 toward the switch 4. The same applies to the other entries.

The status flag included in each entry indicates whether the related physical link is available or not. If validity of a physical link is confirmed, the status flag of the entry related to the physical link is set to "1 (available)". On the other hand, if validity of a physical link is not yet confirmed or failure occurs at the physical link, the status flag of the entry related to the physical link is set to "0 (not available)". In the example shown in FIG. 4, the status flags of all the entries are "1".

Step S12:

The route designing unit 12 refers to the physical topology indicated by the above-mentioned topology table TPL to determine (design) the transfer route of the check frame FR. Then, the route designing unit 12 creates the route table RTE indicating the determined transfer route and stores it in the storage unit 10.

Here, the route designing unit 12 may determine the transfer route such that all of the physical links 71 to 75 is traversable by the transfer route. When determining the traversable route, an algorithm for solving the traveling salesman problem (for example, refer to Patent Literature 4, Patent Literature 5, Patent Literature 6 and Patent Literature 7) can be used. In this case, each physical link corresponds to a "destination to visit by a salesman in the traveling salesman problem".

Moreover, the transfer route may not be a complete traversable route. The transfer route may be determined such that the check frame FR travels as many physical links as possible. Alternatively, all the physical links 71 to 75 may be covered by combining a plurality of traversable routes. In this case, successive route IDs such as "00", "01", "02" . . . are given to the respective traversable routes.

Figure 5:
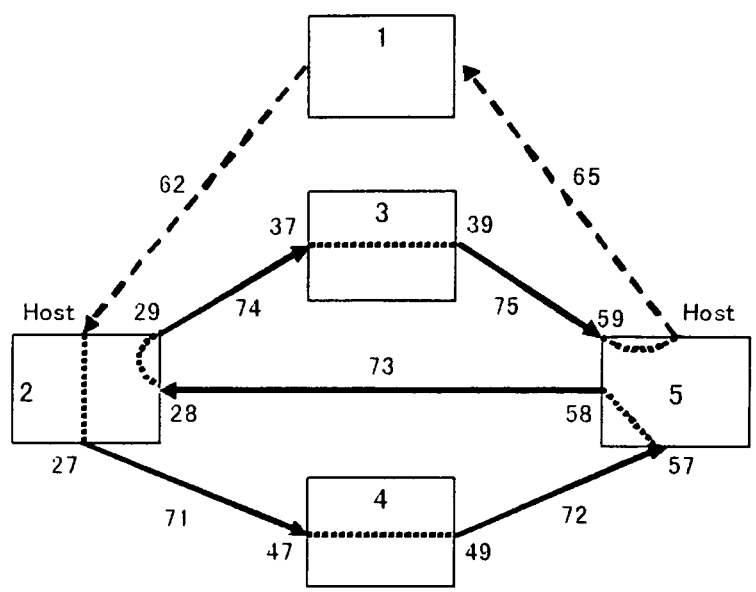
FIG. 5 shows an example of a transfer route of check frames.

FIG. 5 shows an example of the transfer route with which the physical links 71 to 75 are traversable. In the case of the transfer route shown in FIG. 5, the switch 2, the physical link 71, the switch 4, the physical link 72, the switch 5, the physical link 73, the switch 2, the physical link 74, the switch 3, the physical link 75 and the switch 5 are connected in this order. The check frame FR is forwarded along this transfer route in a forward direction or in a backward direction. Here, the "forward direction" is defined as a direction from the switch 2 toward the switch 5 along the transfer route. A start-point of the forward route is the switch 2 (start-point switch) and an end-point thereof is the switch 5 (end-point switch). On the other hand, the "backward direction" is defined as a direction from the switch 5 toward the switch 2 along the transfer route. A start-point of the backward route is the switch 5 and an end-point thereof is the switch 2.

FIG. 6 shows an example of the route table RTE in the case of the transfer route shown in FIG. 5. The route table RTE has a plurality of entries that indicate in order the transfer route shown in FIG. 5. Each entry indicates the route ID, a stopover switch, a forward order, a backward order, a forward status and a backward status. The route ID is an ID that is given with respect to each transfer route, as described above. The stopover switch is a switch on the transfer route at which the check frame FR stops over. The forward order is an order (number of stages) of the stopover switch on the forward route and is set in an ascending order from the upper entry. The backward order is an order (number of stages) of the stopover switch on the backward route and is set in a descending order from the upper entry. For example, the top entry in FIG. 6 indicates that the switch 2 is the first switch on the forward route and the sixth switch on the backward route. The forward status and the backward status included in each entry are flags used in processing of identifying location of failure (Step S30) described later. An initial value of the forward status and the backward status each is "0".

It should be noted that the check frame FR in the present exemplary embodiment is classified into a "forward check frame FRA" that is forwarded in the forward direction along the transfer route and a "backward check frame FRB" that is forwarded in the backward direction along the transfer route.

FIG. 7 is a conceptual diagram showing an example of the forward check frame FRA. The forward check frame FRA has information on a destination MAC address (MAC DA), a source MAC address (MAC SA), the route ID and the forward order i. In the present exemplary embodiment, the destination MAC address is used for distinguishing the forward check frame FRA. The setting of the destination MAC address is arbitrary as long as the forward check frame FRA can be distinguished. For example, the destination MAC address of the forward check frame FRA is set to "00-00-4c-00-aa-00". The source MAC address is set to a MAC address "00-00-4c-00-12-34" of the management host 1. The route ID is an ID that is given with respect to each transfer route, as described above. The forward order i indicates the number of stages of the switch that the forward check frame FRA has stopped over after transmitted from the management host 1. More specifically, the forward order i is initialized to an initial value=0 at a time when transmitted from the management host 1 and is incremented by 1 by the forwarding processing unit of the stopover switch. Therefore, the forward order i in the forward check frame FRA corresponds to the above-mentioned forward order indicated by the route table RTE.

FIG. 8 is a conceptual diagram showing an example of the backward check frame FRB. The backward check frame FRB has information on a destination MAC address (MAC DA), a source MAC address (MAC SA), the route ID and the backward order j. In the present exemplary embodiment, the destination MAC address is used for distinguishing the backward check frame FRB. The setting of the destination MAC address is arbitrary as long as the backward check frame FRB can be distinguished. For example, the destination MAC address of the backward check frame FRB is set to "00-00-4c-00-aa-01". The source MAC address is set to a MAC address "00-00-4c-00-12-34" of the management host 1. The route ID is an ID that is given with respect to each transfer route, as described above. The backward order j indicates the number of stages of the switch that the backward check frame FRB has stopped over after transmitted from the management host 1. More specifically, the backward order j is initialized to an initial value=0 at a time when transmitted from the management host 1 and is incremented by 1 by the forwarding processing unit of the stopover switch. Therefore, the backward order j in the backward check frame FRB corresponds to the above-mentioned backward order indicated by the route table RTE.

Step S13:

The entry control unit 13 of the management host 1 instructs the table setup unit of each of the switches 2 to 5 to set up each forwarding table. At this time, the entry control unit 13 refers to the topology table TPL and the route table RTE stored in the storage unit 10. Then, the entry control unit 13 determines contents of the instruction such that the forward check frame FRA and the backward check frame FRB are forwarded along the transfer route indicated by the route table RTE. The table setup command indicating the instruction is transmitted from the entry control unit 13 to each switch (2, 3, 4, 5) through the node communication unit 15 and the control link (62, 63, 64, 65) (refer also to Step S13 in FIG. 13).

In switch 2, the table setup unit 24 receives the table setup command from the host communication unit 23. Then, the table setup unit 24 sets, in accordance with the table setup command, the contents of the forwarding table 22 stored in the table storage unit 20. At this time, the contents of the forwarding table 22 are set such that the forward check frame FRA and the backward check frame FRB are forwarded along the above-mentioned transfer route.

FIG. 9 shows an example of the forwarding table 22 in the case of the transfer route shown in FIG. 5. The forwarding table 22 indicates an input port, the destination MAC address (MAC DA), the source MAC address (MAC SA) and an output port.

The input port indicates the input source (port or host communication unit 23) to which the check frame FR is input. If the input source is any port (i.e. another switch), the input port is expressed by its port number. If the input source is the host communication unit 23 (i.e. the management host 1), the input port is expressed by "HOST".

The output port indicates the forwarding destination (port or host communication unit 23) to which the check frame FR is forwarded. If the forwarding destination is any port (i.e. another switch), the output port is expressed by its port number. If the forwarding destination is the host communication unit 23 (i.e. management host 1), the output port is expressed by "HOST". It should be noted that a plurality of output ports may be set with respect to one entry. In this case, the check frame FR is output to the respective output ports.

The destination MAC address in the forwarding table 22 is the same as the above-mentioned destination MAC address in the forward check frame FRA or the backward check frame FRB. In the present example, the destination MAC address is "00-00-4c-00-aa-00" or "00-00-4c-00-aa-01". Moreover, the source MAC address in the forwarding table 22 is the same as the above-mentioned source MAC address in the forward check frame FRA and the backward check frame FRB. In the present example, the source MAC address is the MAC address "00-00-4c-00-12-34" of the management host 1. It should be noted that the source MAC address may be omitted if only one management host 1 is used.

As described above, the forwarding table 22 in the present example includes the input source (input port), the forwarding destination (output port) and header information (destination MAC address, source MAC address and the like) regarding the check frame FR. In other words, the forwarding table 22 in the present example indicates a correspondence relationship between the input source, the header information and the forwarding destination with regard to the check frame FR. In the case where the destination MAC address is "00-00-4c-00-aa-00", the entry indicates a correspondence relationship between the input source and the forwarding destination with regard to the forward check frame FRA. On the other hand, in the case where the destination MAC address is "00-00-4c-00-aa-01", the entry indicates a correspondence relationship between the input source and the forwarding destination with regard to the backward check frame FRB. By referring to such the forwarding table 22, the forwarding processing unit 21 is able to forward the received forward check frame FRA or backward check frame FRB to the designated forwarding destination. At this time, the input port and the header information (destination MAC address, source MAC address) are used as a search keyword for the related output port.

As an example, let us consider a case where the forwarding processing unit 21 receives the forward check frame FRA (destination MAC address=00-00-4c-00-aa-00, source MAC address=00-00-4c-00-12-34) from the host communication unit 23 (input port=HOST). In this case, the first entry in the forwarding table 22 becomes a hit entry. Therefore, the forwarding processing unit 21 forwards the forward check frame FRA to the output port 27 indicated by the hit entry. That is, the forward check frame FRA transmitted from the management host 1 is output to the physical link 71 connected to the output port 27 and thus forwarded to the switch 4. In this manner, the forwarding of the forward check frame FRA along the forward direction is achieved (see FIG. 5).

Also, as an example, let us consider a case where the forwarding processing unit 21 receives the backward check frame FRB (destination MAC address=00-00-4c-00-aa-01, source MAC address=00-00-4c-00-12-34) from the port 29 (input port=29) connected to the switch 3. In this case, the third entry in the forwarding table 22 becomes a hit entry. Therefore, the forwarding processing unit 21 forwards the backward check frame FRB to the output port 28 indicated by the hit entry. That is, the backward check frame FRB transmitted from the switch 3 is output to the physical link 73 connected to the output port 28 and thus forwarded to the switch 5. In this manner, the forwarding of the backward check frame FRB along the backward direction is achieved (see FIG. 5).

In switch 3, the table setup unit 34 receives the table setup command from the host communication unit 33. Then, the table setup unit 34 sets, in accordance with the table setup command, the contents of the forwarding table 32 stored in the table storage unit 30. FIG. 10 shows an example of the forwarding table 32. As in the case of the above-described switch 2, the contents of the forwarding table 32 are set such that the forward check frame FRA and the backward check frame FRB are forwarded along the transfer route shown in FIG. 5.

In switch 4, the table setup unit 44 receives the table setup command from the host communication unit 43. Then, the table setup unit 44 sets, in accordance with the table setup command, the contents of the forwarding table 42 stored in the table storage unit 40. FIG. 11 shows an example of the forwarding table 42. As in the case of the above-described switch 2, the contents of the forwarding table 42 are set such that the forward check frame FRA and the backward check frame FRB are forwarded along the transfer route shown in FIG. 5.

In switch 5, the table setup unit 54 receives the table setup command from the host communication unit 53. Then, the table setup unit 54 sets, in accordance with the table setup command, the contents of the forwarding table 52 stored in the table storage unit 50. FIG. 12 shows an example of the forwarding table 52. As in the case of the above-described switch 2, the contents of the forwarding table 52 are set such that the forward check frame FRA and the backward check frame FRB are forwarded along the transfer route shown in FIG. 5.

Figure 13:
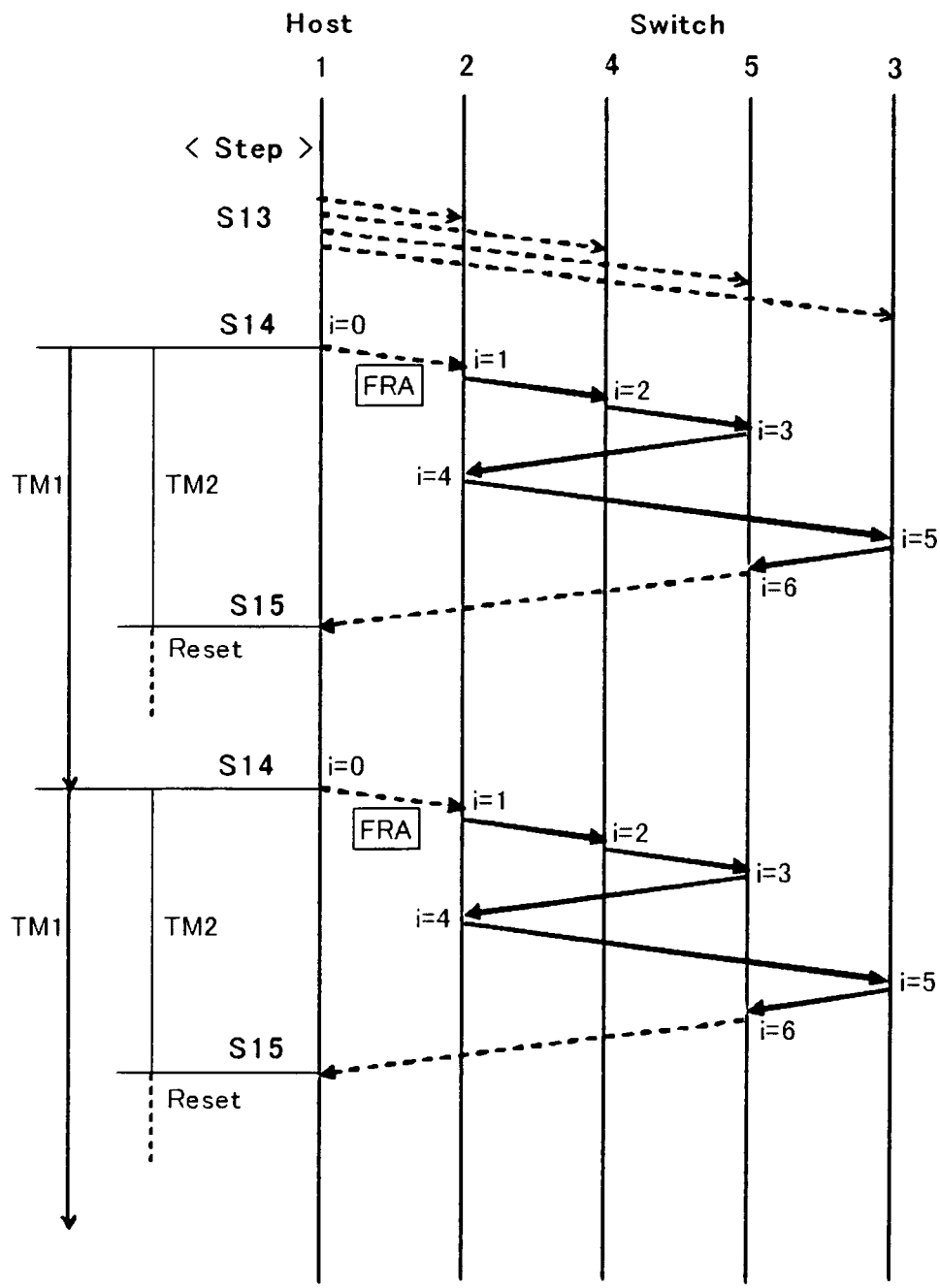
FIG. 13 shows an example of frame forwarding processing in the first exemplary embodiment.

Step S14:
After the Step S13 is completed, the monitoring unit 14 of the management host 1 periodically performs transmission of the forward check frame FRA. The forwarding processing unit of each switch, when receiving the forward check frame FRA, forwards the forward check frame FRA in the forward direction. FIG. 13 shows transmission and forwarding processing of the forward check frame FRA in the present exemplary embodiment. In FIG. 13, dashed arrows indicate communications by using the control links 62 to 65, and solid arrows indicate communications by using the physical links 71 to 75.

First, the monitoring unit 14 of the management host 1 generates a forward check frame FRA as shown in FIG. 7. At this time, the forward order i is initialized to an initial value=0. Subsequently, the monitoring unit 14 refers to the route table RTE shown in FIG. 6 to transmit the forward check frame FRA to the start-point switch 2 of the forward route. Moreover, the monitoring unit 14 starts a first timer TM1 and a second timer TM2 at the same time as the transmission of the forward check frame FRA. The first timer TM1 is used for performing the periodical transmission of the forward check frame FRA. That is, the monitoring unit 14 performs the transmission of the forward check frame FRA at a predetermined interval counted by the first timer TM1. The second timer TM2 is used for processing of detecting failure occurrence which will be described later. A set time of the second timer TM2 is substantially longer than a set time of the first timer TM1.

The forward check frame FRA is transmitted from the node communication unit 15 of the management host 1 through the control link 62 to reach the host communication unit 23 of the start-point switch 2. The forwarding processing unit 21 receives the forward check frame FRA from the host communication unit 23 and increases the forward order i of the forward check frame FRA by one. As a result, the forward order i becomes 1. Furthermore, the forwarding processing unit 21 refers to the forwarding table 22 shown in FIG. 9 to forward the received forward check frame FRA to the port 27 (i.e. switch 4).

The forward check frame FRA is transmitted from the port 27 of the switch 2 through the physical link 71 to reach the port 47 of the switch 4. The forwarding processing unit 41 receives the forward check frame FRA from the port 47 and increases the forward order i of the forward check frame FRA by one. As a result, the forward order i becomes 2. Furthermore, the forwarding processing unit 41 refers to the forwarding table 42 shown in FIG. 11 to forward the received forward check frame FRA to the port 49 (i.e. switch 5).

The forward check frame FRA is transmitted from the port 49 of the switch 4 through the physical link 72 to reach the port 57 of the switch 5. The forwarding processing unit 51 receives the forward check frame FRA from the port 57 and increases the forward order i of the forward check frame FRA by one. As a result, the forward order i becomes 3. Furthermore, the forwarding processing unit 51 refers to the forwarding table 52 shown in FIG. 12 to forward the received forward check frame FRA to the port 58 (i.e. switch 2).

The forward check frame FRA is transmitted from the port 58 of the switch 5 through the physical link 73 to reach the port 28 of the switch 2. The forwarding processing unit 21 receives the forward check frame FRA from the port 28 and increases the forward order i of the forward check frame FRA by one. As a result, the forward order i becomes 4. Furthermore, the forwarding processing unit 21 refers to the forwarding table 22 shown in FIG. 9 to forward the received forward check frame FRA to the port 29 (i.e. switch 3).

The forward check frame FRA is transmitted from the port 29 of the switch 2 through the physical link 74 to reach the port 37 of the switch 3. The forwarding processing unit 31 receives the forward check frame FRA from the port 37 and increases the forward order i of the forward check frame FRA by one. As a result, the forward order i becomes 5. Furthermore, the forwarding processing unit 31 refers to the forwarding table 32 shown in FIG. 10 to forward the received forward check frame FRA to the port 39 (i.e. switch 5).

The forward check frame FRA is transmitted from the port 39 of the switch 3 through the physical link 75 to reach the port 59 of the switch 5. The forwarding processing unit 51 receives the forward check frame FRA from the port 59 and increases the forward order i of the forward check frame FRA by one. As a result, the forward order i becomes 6. Furthermore, the forwarding processing unit 51 refers to the forwarding table 52 shown in FIG. 12 to forward the received forward check frame FRA to the host communication unit 53 (i.e. management host 1).

The forward check frame FRA is transmitted from the host communication unit 53 of the end-point switch 5 through the control link 65 to reach the node communication unit 15 of the management host 1. In this manner, the transfer (travel) of the forward check frame FRA along the forward route is achieved.

Step S15:

The monitoring unit 14 of the management host 1 monitors arrival of the forward check frame FRA. In the case of the example shown in FIG. 13, the forward check frame FRA returns back to the management host 1 from the end-point switch 5 without being lost on the way. In this case, the monitoring unit 14 receives the forward check frame FRA from the node communication unit 15 before the sufficiently long second timer TM2 expires. That is, the monitoring unit 14 receives the forward check frame FRA from the end-point switch 5 within a predetermined period of time counted by the second timer TM2 after transmitting the forward check frame FRA to the start-point switch 2. In this case, the monitoring unit 14 resets the second timer TM2 and determines that no failure occurs on the transfer route in the forward direction (Step S20; No).

After that, when the first timer TM1 expires, the monitoring unit 14 transmits a new forward check frame FRA. Then, the Steps S14 and S15 are repeated. In this manner, at normal times, the forward check frame FRA periodically travels the transfer route and whether or not a failure occurs is judged every travel.

Figure 14:
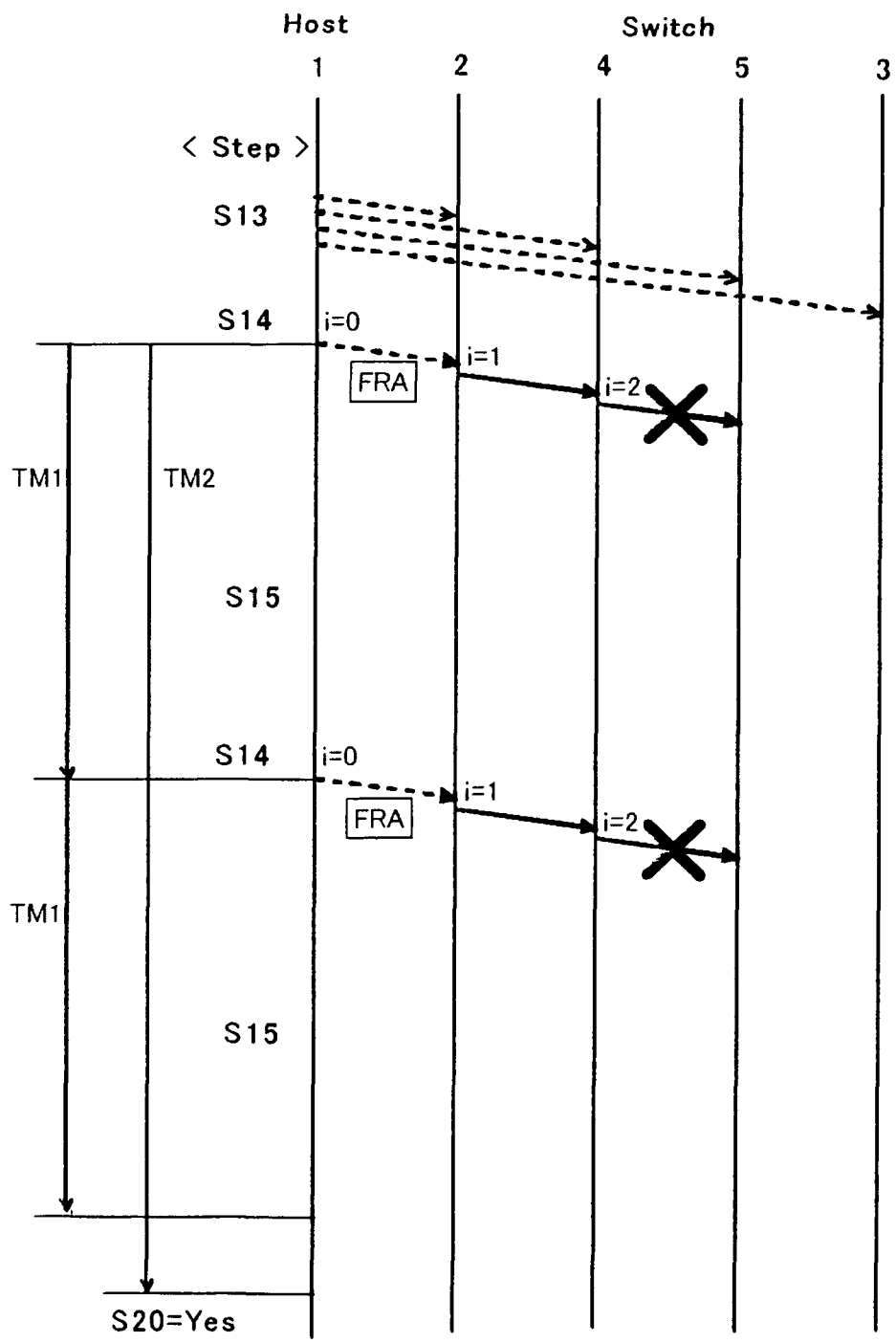
FIG. 14 shows another example of frame forwarding processing in the first exemplary embodiment.

FIG. 14 shows a case where a failure occurs at a part of the transfer route. As an example, let us consider a case where a failure occurs at the physical link 72 between the switch 4 and the switch 5 and the bi-directional communication there becomes impossible. As in the case of FIG. 13, the monitoring unit 14 periodically transmits the forward check frame FRA. However, since the failure occurs at the physical link 72, the forward check frame FRA is not transferred from the switch 4 to the switch 5. Therefore, the second timer TM2 expires without the monitoring unit 14 receiving the forward check frame FRA. That is, the monitoring unit 14 does not receive the forward check frame FRA from the end-point switch 5 within a predetermined period of time counted by the second timer TM2 after transmitting the forward check frame FRA to the start-point switch 2. In this case, the monitoring unit 14 determines that a failure occurs somewhere on the transfer route (Step S20; Yes).

In this manner, the monitoring unit 14 can detect failure occurrence on the transfer route by monitoring the reception state of the forward check frame FRA. When the failure occurrence is detected, the monitoring unit 14 instructs the display unit 16 to display that effect. The display unit 16 displays the physical topology indicated by the topology table TPL, the transfer route indicated by the route table RTE and the failure occurrence on the transfer route. If the failure occurrence is detected by the monitoring unit 14, the communication network management processing proceeds to identification of location of the failure (Step S30).

Figure 15:
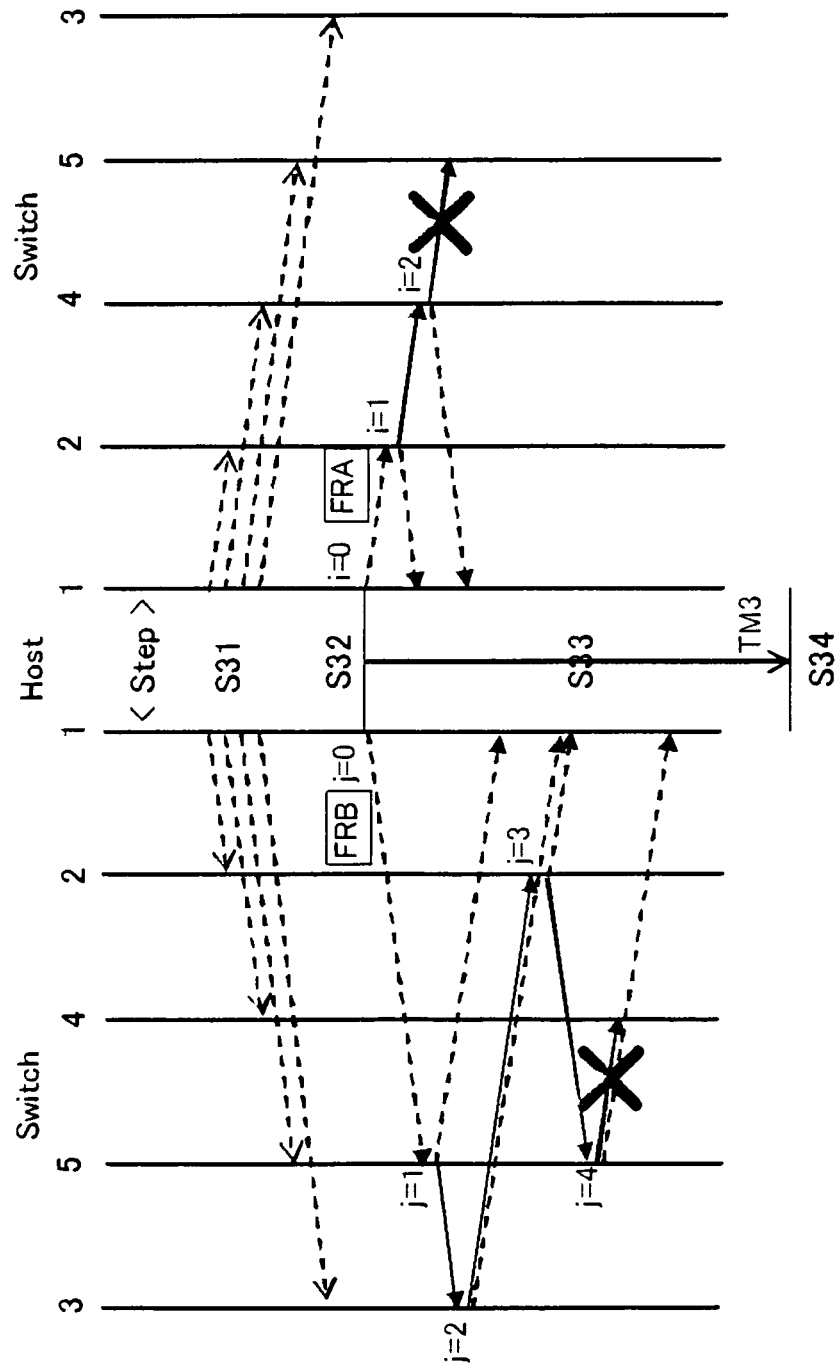
FIG. 15 shows processing of identifying location of failure in the first exemplary embodiment.

Step S30:

In Step S30, processing of identifying location of the failure is carried out. FIG. 15 shows the processing of identifying location of the failure in the present exemplary embodiment.

Step S31:

The entry control unit 13 of the management host 1 instructs each of the switches 2 to 5 to set up each forwarding table again. More specifically, the entry control unit 13 instructs each of the switches 2 to 5 to forward a copy of the received check frame FR also to the management host 1. For this purpose, the entry control unit 13 instructs the table setup unit of each switch to add the management host 1 to the forwarding destination indicated by each forwarding table. A table setup command indicating the instruction is transmitted from the entry control unit 13 to each switch (2, 3, 4, 5) through the node communication unit 15 and the control link (62, 63, 64, 65).

The table setup unit 24 of the switch 2 sets up the forwarding table 22 again in accordance with the table setup command. FIG. 16 shows the forwarding table 22 after the resetting. The management host 1 (HOST) is added to the output port of each entry, as compared with that shown in FIG. 9. Similarly, the table setup unit 34 of the switch 3, the table setup unit 44 of the switch 4 and the table setup unit 54 of the switch 5 respectively set up the forwarding tables 32, 42 and 52 again in accordance with the table setup command. FIG. 17, FIG. 18 and FIG. 19 respectively show the forwarding tables 32, 42 and 52 after the resetting.

Step S32:

After the Step S31 is completed, the monitoring unit 14 transmits one forward check frame FRA. At this time, the monitoring unit 14 starts a third timer TM3. The third timer TM3 is used for making a timing for identifying location of the failure. Moreover, the monitoring unit 14 may transmit one backward check frame FRB at about the same time as the one forward check frame FRA.

(Forward Check Frame FRA)

The transfer of the forward check frame FRA is similar to that in the case shown in FIGS. 13 and 14. It should be noted here that the forwarding processing unit of the switch that receives the forward check frame FRA forwards (transmits) the forward check frame FRA not only to the forward direction but also to the management host 1.

First, the monitoring unit 14 of the management host 1 generates a forward check frame FRA as shown in FIG. 7. At this time, the forward order i is initialized to an initial value=0. Subsequently, the monitoring unit 14 refers to the route table RTE shown in FIG. 6 to transmit one forward check frame FRA to the start-point switch 2 of the forward route. The forward check frame FRA arrives at the switch 2 through the control link 62.

The forwarding processing unit 21 of the switch 2 receives the forward check frame FRA from the management host 1 (HOST) and increases the forward order i of the forward check frame FRA by one. As a result, the forward order i becomes 1. Furthermore, the forwarding processing unit 21 refers to the forwarding table 22 shown in FIG. 16 to forward the received forward check frame FRA to the port 27 (i.e. switch 4) and the HOST (i.e. management host 1).

The forwarding processing unit 41 of the switch 4 receives the forward check frame FRA from the switch 2 (port 47) and increases the forward order i of the forward check frame FRA by one. As a result, the forward order i becomes 2. Furthermore, the forwarding processing unit 41 refers to the forwarding table 42 shown in FIG. 18 to forward the received forward check frame FRA to the port 49 (i.e. switch 5) and the HOST (i.e. management host 1).

The bi-directional failure is occurring at the physical link 72 connected to the port 49. Therefore, the forward check frame FRA does not reach the switch 5.

(Backward Check Frame FRB)

The transfer of the backward check frame FRB is similar to the transfer of the forward check frame FRA. However, the backward check frame FRB is forwarded along the backward route opposite to the forward route. The forwarding processing unit of the switch that receives the backward check frame FRB forwards (transmits) the backward check frame FRB not only to the backward direction but also to the management host 1.

First, the monitoring unit 14 of the management host 1 generates a backward check frame FRB as shown in FIG. 8. At this time, the backward order j is initialized to an initial value=0. Subsequently, the monitoring unit 14 refers to the route table RTE shown in FIG. 6 to transmit one backward check frame FRB to the start-point switch 5 of the backward route (i.e. the end-point switch of the forward route). The backward check frame FRB arrives at the switch 5 through the control link 65.

The forwarding processing unit 51 of the switch 5 receives the backward check frame FRB from the management host 1 (HOST) and increases the backward order j of the backward check frame FRB by one. As a result, the backward order j becomes 1. Furthermore, the forwarding processing unit 51 refers to the forwarding table 52 shown in FIG. 19 to forward the received backward check frame FRB to the port 59 (i.e. switch 3) and the HOST (i.e. management host 1).

The forwarding processing unit 31 of the switch 3 receives the backward check frame FRB from the switch 5 (port 39) and increases the backward order j of the backward check frame FRB by one. As a result, the backward order j becomes 2. Furthermore, the forwarding processing unit 31 refers to the forwarding table 32 shown in FIG. 17 to forward the received backward check frame FRB to the port 37 (i.e. switch 2) and the HOST (i.e. management host 1).

The forwarding processing unit 21 of the switch 2 receives the backward check frame FRB from the switch 3 (port 29) and increases the backward order j of the backward check frame FRB by one. As a result, the backward order j becomes 3. Furthermore, the forwarding processing unit 21 refers to the forwarding table 22 shown in FIG. 16 to forward the received backward check frame FRB to the port 28 (i.e. switch 5) and the HOST (i.e. management host 1).

The forwarding processing unit 51 of the switch 5 receives the backward check frame FRB from the switch 2 (port 58) and increases the backward order j of the backward check frame FRB by one. As a result, the backward order j becomes 4. Furthermore, the forwarding processing unit 51 refers to the forwarding table 52 shown in FIG. 19 to forward the received backward check frame FRB to the port 57 (i.e. switch 4) and the HOST (i.e. management host 1).

The bi-directional failure is occurring at the physical link 72 connected to the port 57. Therefore, the backward check frame FRB does not reach the switch 4.

Step S33:

As described above, each switch forwards (transmits) the received forward check frame FRA or backward check frame FRB to the management host 1 as well. At this time, each switch may notify the management host 1 of its own switch number. The monitoring unit 14 of the management host 1 monitors arrival of the forward check frame FRA/the backward check frame FRB from the switches 2 to 5. Then, in response to reception of the forward check frame FRA, the monitoring unit 14 updates the "forward status" of the related entry in the route table RTE. Also, in response to reception of the backward check frame FRB, the monitoring unit 14 updates the "backward status" of the related entry in the route table RTE. FIG. 20 shows the route table RTE after the updating.

The switch 2 forwards the forward check frame FRA received from the management host 1 to the management host 1 through the control link 62. The forward order i of the forward check frame FRA is 1. The monitoring unit 14 receives the forward check frame FRA and rewrites the forward status of the entry related to "stopover switch=2, forward order=1" in the route table RTE to "1".

The switch 4 forwards the forward check frame FRA received from the switch 2 to the management host 1 through the control link 64. The forward order i of the forward check frame FRA is 2. The monitoring unit 14 receives the forward check frame FRA and rewrites the forward status of the entry related to "stopover switch=4, forward order=2" in the route table RTE to "1".

The management host 1 does not receive the forward check frame FRA from the subsequent switches on the forward route. Therefore, the forward status of the remaining entries each is maintained at "0".

The switch 5 forwards the backward check frame FRB received from the management host 1 to the management host 1 through the control link 65. The backward order j of the backward check frame FRB is 1. The monitoring unit 14 receives the backward check frame FRB and rewrites the backward status of the entry related to "stopover switch=5, backward order=1" in the route table RTE to "1".

The switch 3 forwards the backward check frame FRB received from the switch 5 to the management host 1 through the control link 63. The backward order j of the backward check frame FRB is 2. The monitoring unit 14 receives the backward check frame FRB and rewrites the backward status of the entry related to "stopover switch=3, backward order=2" in the route table RTE to "1".

The switch 2 forwards the backward check frame FRB received from the switch 3 to the management host 1 through the control link 62. The backward order j of the backward check frame FRB is 3. The monitoring unit 14 receives the backward check frame FRB and rewrites the backward status of the entry related to "stopover switch=2, backward order=3" in the route table RTE to "1".

The switch 5 forwards the backward check frame FRB received from the switch 2 to the management host 1 through the control link 65. The backward order j of the backward check frame FRB is 4. The monitoring unit 14 receives the backward check frame FRB and rewrites the backward status of the entry related to "stopover switch=5, backward order=4" in the route table RTE to "1".

The management host 1 does not receive the backward check frame FRB from the subsequent switches on the backward route. Therefore, the backward status of the remaining entries each is maintained at "0".

Step S34:

After the third timer TM3 expires, the monitoring unit 14 of the management host 1 refers to the route table RTE stored in the storage unit 10. Then, the monitoring unit 14 performs identification of location of the failure, based on the forward status and the backward status in the route table RTE.

The following can be seen from the route table RTE shown in FIG. 20. That is, the forward status is "1" in the entries whose forward order is 1 to 2 and the forward status is "0" in the subsequent entries. This means that the forward check frame FRA is normally transferred from the start-point switch 2 to the switch 4 along the forward route but not transferred from the switch 4 to the switch 5. Therefore, the monitoring unit 14 determines that a failure in the forward direction is occurring at the physical link 72 from the switch 4 toward the switch 5. Moreover, the backward status is "1" in the entries whose backward order is 1 to 4 and the backward status is "0" in the subsequent entries. This means that the backward check frame FRB is normally transferred from the start-point switch 5 to the switch 5 along the backward route but not transferred from the switch 5 to the switch 4. Therefore, the monitoring unit 14 determines that a failure in the backward direction is occurring at the physical link 72 from the switch 5 toward the switch 4. That is, the monitoring unit 14 determines that a bi-directional failure is occurring at the physical link 72 between the switch 4 and the switch 5.

As described above, the monitoring unit 14 can identify location of failure on the transfer route based on reception state of the forward check frame FRA or the backward check frame FRB from the switches 2 to 5.

It should be noted that the case where the bi-directional failure is occurring at the physical link 72 is exemplified in the above description. The same applies to the other cases. That is, if the monitoring unit 14 receives the forward check frame FRA from a switch (first switch) on the forward route and does not receive the forward check frame FRA from the next switch (second switch), the monitoring unit 14 determines that a failure in the forward direction is occurring at the physical link between the two switches. Also, if the monitoring unit 14 receives the backward check frame FRB from a switch (third switch) on the backward route and does not receive the backward check frame FRB from the next switch (fourth switch), the monitoring unit 14 determines that a failure in the backward direction is occurring at the physical link between the two switches. A case where the first switch and the fourth switch are the same and the second switch and the third switch are the same corresponds to the above-describe example (bi-directional failure).

When the location of failure is identified, the monitoring unit 14 updates the status flag in the topology table TPL stored in the storage unit 10. FIG. 21 shows the topology table TPL after the updating. As shown in FIG. 21, the status flag of the entry "source switch=4, source port=49, destination switch=5, destination port=57" related to the physical link 72 in the forward direction is updated to "0 (not available)". Moreover, the status flag of the entry "source switch=5, source port=57, destination switch=4, destination port=49" related to the physical link 72 in the backward direction is updated to "0 (not available)".

Step S100:

The monitoring unit 14 instructs the display unit 16 to display the identified location of failure. The display unit 16 refers to the topology table TPL shown in FIG. 21 to display that the bi-directional failure is occurring at the physical link 72.

1-3. Effects

The present exemplary embodiment provides a technique of performing centralized management of the communication network NET by using the management host 1. In the communication network management processing, the management host 1 makes the check frame FR travel along a predetermined transfer route. Here, each switch (each node) in the communication network is provided with the forwarding table. The contents of the forwarding table are set up in accordance with the instruction from the management host 1 such that the check frame FR is forwarded along the predetermined transfer route. Therefore, each switch just needs to refer to the forwarding table to forward the received check frame FR to a designated forwarding destination. Thus, the traveling of the check frame FR along the predetermined transfer route is achieved. The management host 1 can detect whether or not a failure occurs on the transfer route based on whether or not it receives the check frame FR within a predetermined period of time.

According to the present exemplary embodiment, there is no need to incorporate the health-check table including information of the transfer route, the check list and the like (see Patent Literature 2, Patent Literature 3) into the check frame FR. Therefore, each switch needs not to search for the related entry in the health-check table. In particular, even in a case of a large number of switches, there is no need to search for the related entry from a large number of entries, and thus a processing time in each switch is prevented from increasing. Moreover, each switch needs not to refer to the next entry following the related entry in order to forward the check frame FR to the next node. As a result, burden placed on each switch is reduced.

Moreover, according to the present exemplary embodiment, it is possible to identify the location of failure on the predetermined transfer route by a simple processing. The reason is that each switch forwards the received forward check frame FRA or backward check frame FRB to the management host 1 as well. The management host 1 can easily identify the location of failure on the transfer route based on reception state of the forward check frame FRA or the backward check frame FRB from the plurality of switches. The complicated processing such as required in Patent Literature 2 or Patent Literature 3 is not necessary for identifying the location of failure. For example, such processing as described in Patent Literature 3 that each node investigates whether or not it can communicate with the next node is not necessary. This also contributes to reduction of burden placed on each switch.

Particularly, in a case where the node in the communication network is a switch with a simple configuration, the complicated processing such as required in Patent Literature 2 or Patent Literature 3 is substantially impossible. The present exemplary embodiment can be applied to the case where the node in the communication network is a switch.

Moreover, in the case where the transfer route of the check frame FR is a traversable route, health-checking of a large number of physical links is possible by only transmitting one check frame FR. It is therefore possible to reduce the number of check frames FR that the management host 1 needs to transmit and receive. As a result, burden placed on the management host 1 is reduced, which is preferable. Furthermore, since the burden placed on the management host 1 is reduced, it is possible to increase a transmission frequency of the check frame FR. As a result, it is possible to quickly detect failure occurrence on the transfer route.

Moreover, according to the present exemplary embodiment, a ring-shaped network structure is not assumed for achieving the traveling of the check frame FR. The present exemplary embodiment can be applied to a case where the physical topology of the communication network NET is not a ring shape. There is no constraint on the physical topology of the communication network NET.

2. Second Exemplary Embodiment

According to the above-described first exemplary embodiment, the forwarding table of each switch is reset as shown in FIGS. 16 to 19 at the Step S31 after the failure occurrence is detected. According to a second exemplary embodiment of the present invention, the forwarding table of each switch is preliminarily set as shown in FIGS. 16 to 19, before the failure occurrence is detected. In other words, the forwarding destination indicated by the forwarding table of each switch includes the management host 1 (HOST), before the failure occurrence is detected. For example, at the initial setting, the forwarding table of each switch is set up as shown in FIGS. 16 to 19.

Figure 22:
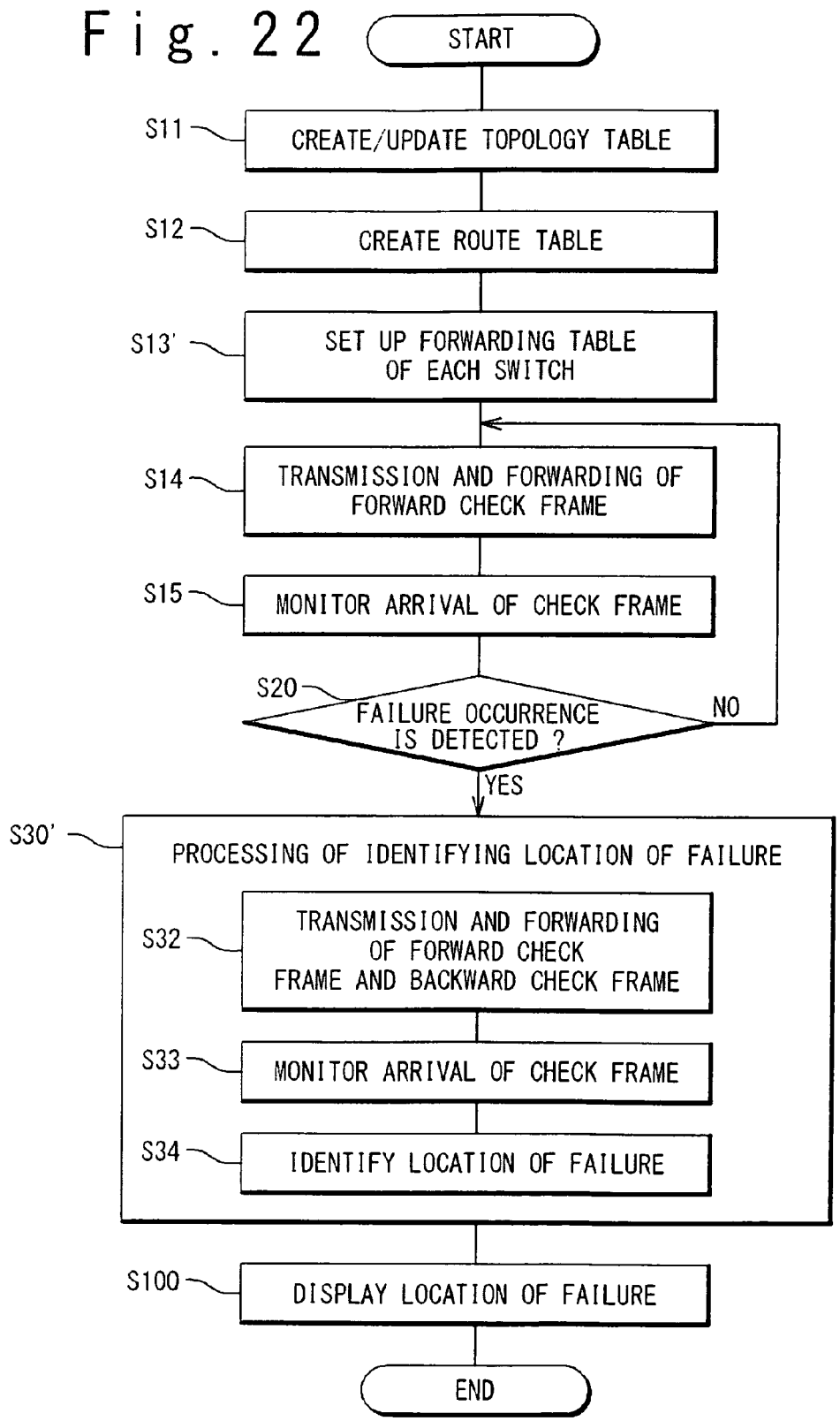
FIG. 22 is a flow chart showing a communication network management method according to a second exemplary embodiment of the present invention.

FIG. 22 is a flow chart showing a communication network management method according to the second exemplary embodiment. According to the present exemplary embodiment, Step S13' is executed instead of the above-described Step S13. In Step S13', the entry control unit 13 of the management host 1 instructs the table setup unit of each switch to set up each forwarding table. Here, the entry control unit 13 determines contents of the instruction such that the check frame FR is forwarded along the transfer route indicated by the route table RTE and the check frame FR is forwarded also to the management host 1 from each switch. As a result, the forwarding table of each switch is set as shown in FIGS. 16 to 19.

Figure 23:
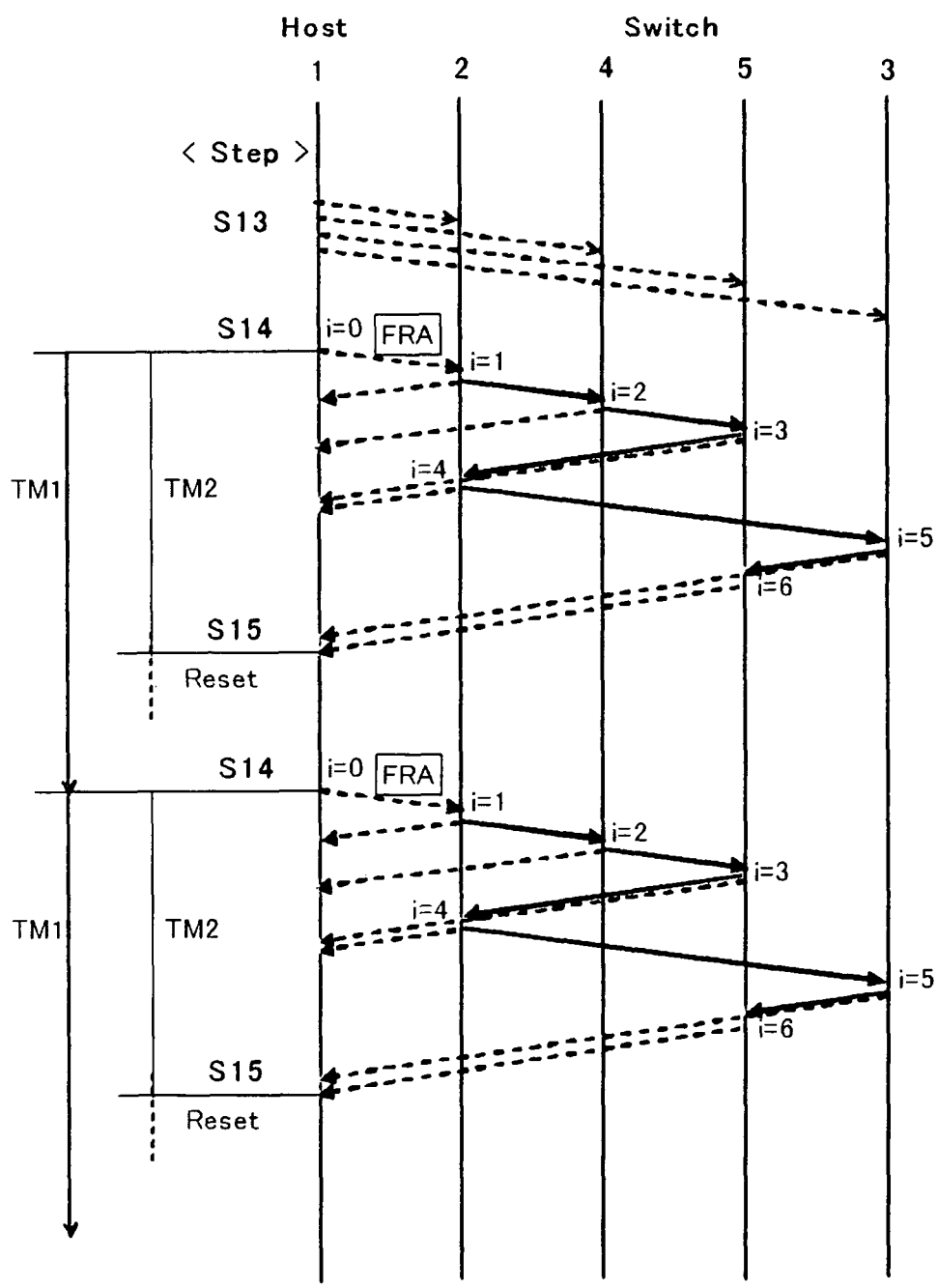
FIG. 23 shows an example of frame forwarding processing in the second exemplary embodiment.
Figure 24:
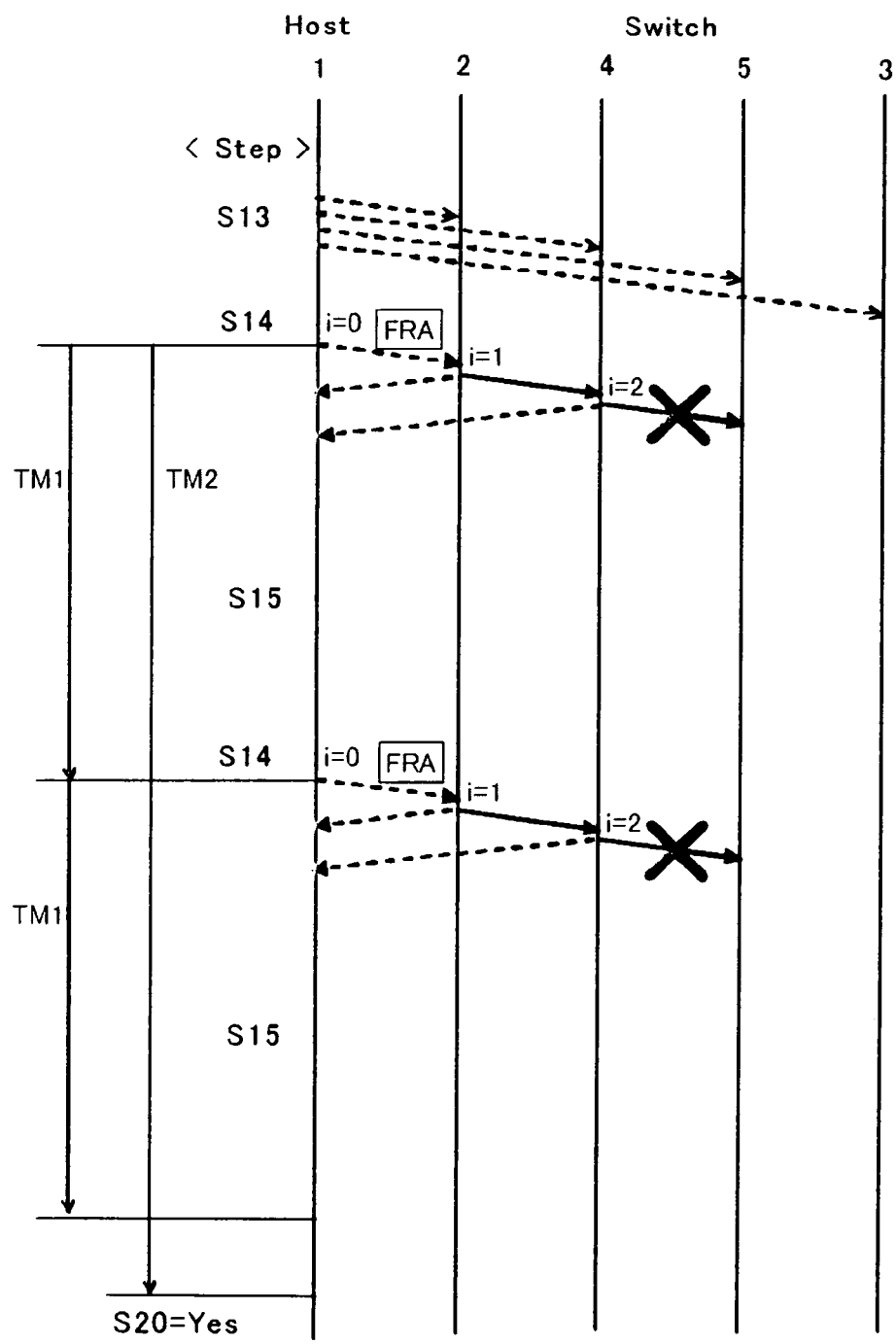
FIG. 24 shows another example of frame forwarding processing in the second exemplary embodiment.

FIG. 23 and FIG. 24 show transmission and forwarding processing of the forward check frame FRA in the present exemplary embodiment and respectively correspond to the foregoing FIG. 13 and FIG. 14. According to the present exemplary embodiment, the forwarding processing unit of the switch that receives the forward check frame FRA forwards the forward check frame FRA not only to the forward direction but also to the management host 1. The others are the same as in the case of the first exemplary embodiment.

Moreover, according to the present exemplary embodiment, Step S30' instead of the above-described Step S30 is executed after the failure occurrence is detected (Step S20; Yes). In the Step S30', Step S31 (resetting of the forwarding table) is omitted. The reason is that the forwarding destination designated by the forwarding table of each switch is already including the management host 1 (HOST). The others are the same as in the case of the first exemplary embodiment.

According to the present exemplary embodiment, the same effects as in the case of the first exemplary embodiment can be obtained. Furthermore, the processing of identifying the location of failure (Step S30') becomes faster because Step S31 is not executed after the failure occurrence is detected.

3. Third Exemplary Embodiment

Figure 25:
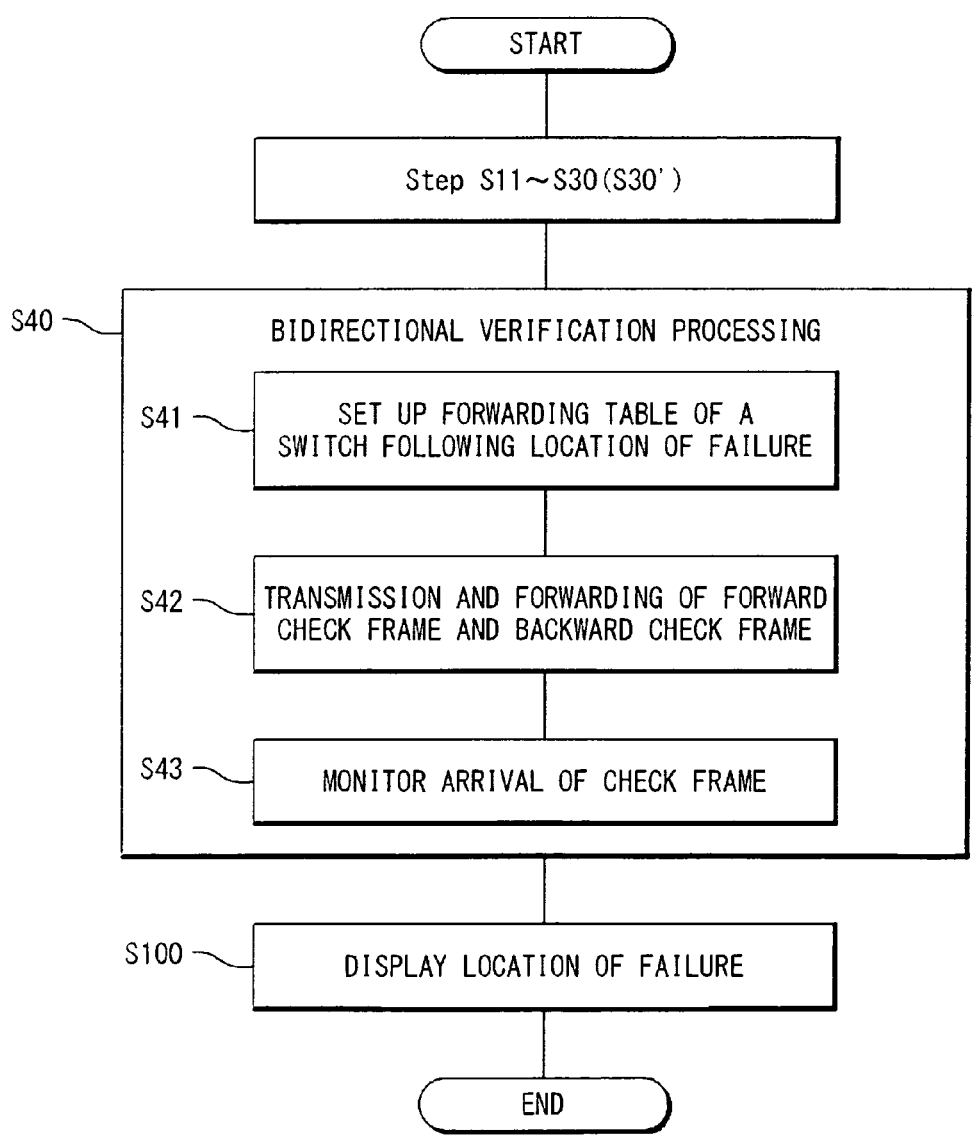
FIG. 25 is a flow chart showing a communication network management method according to a third exemplary embodiment of the present invention.

According to a third exemplary embodiment of the present invention, after the location of failure is identified, the transfer of the forward check frame FRA or the backward check frame FRB continues by jumping the location of failure. FIG. 25 is a flow chart showing a communication network management method according to the third exemplary embodiment. The processing before the identification of the location of failure (Step S30 or S30') is the same as in the case of the foregoing first or second exemplary embodiment. Step S40 is added after the identification of the location of failure.

Step S40:

Let us consider a case where the location of failure is the physical link 72 between the switch 4 and the switch 5 as in the case of the foregoing embodiment. Currently, it has been confirmed that the forward check frame FRA is normally transferred from the start-point switch 2 to the switch 4 along the forward route and the backward check frame FRB is normally transferred from the start-point switch 5 to the switch 5 along the backward route, as indicated by the route table RTE shown in FIG. 20. However, it is not yet verified whether or not the forward check frame FRA is normally transferred from the switch 5 to the end-point switch 5 along the forward route. Similarly, it is not yet verified whether or not the backward check frame FRB is normally transferred from the switch 4 to the end-point switch 2 along the backward route. That is, only one-way communication is verified with regard to some physical links.

Figure 26:
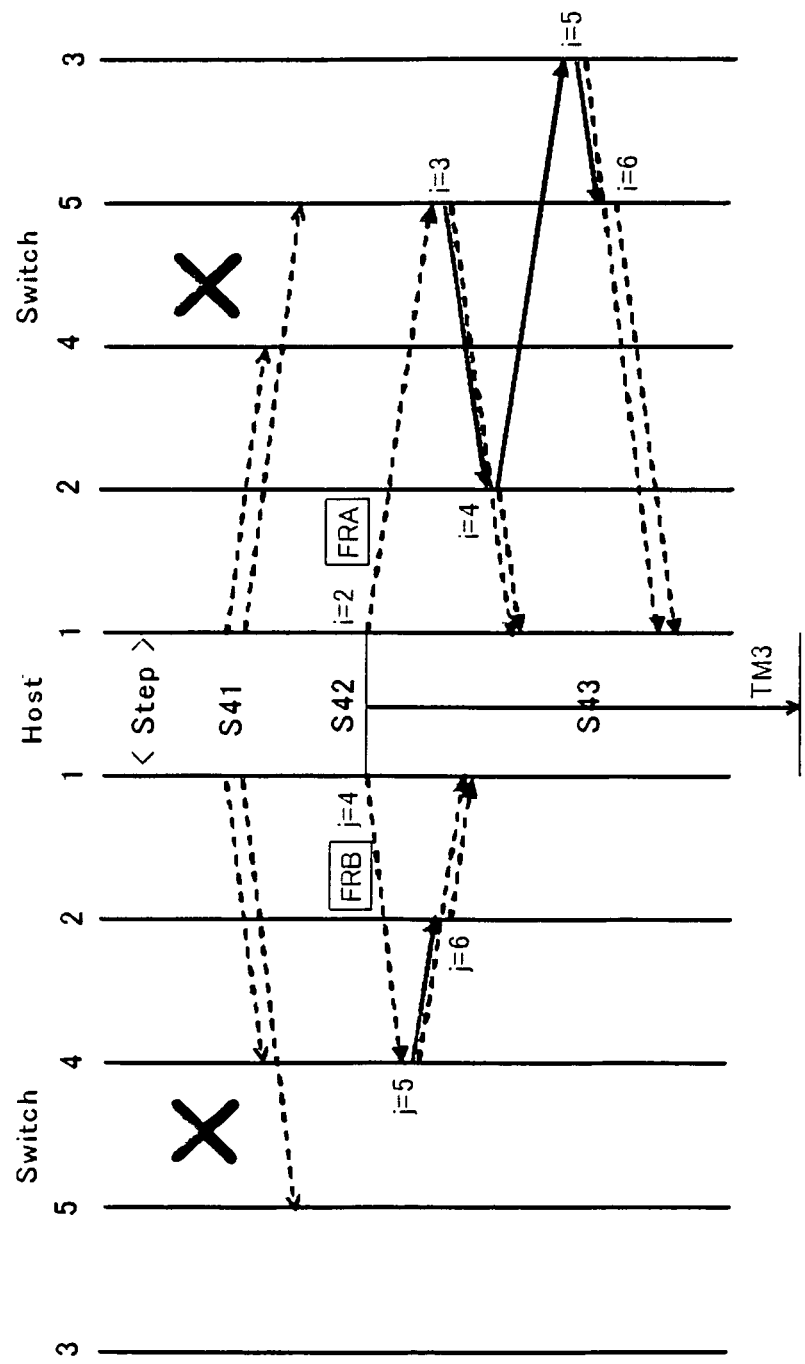
FIG. 26 shows an example of frame forwarding processing in the third exemplary embodiment.

Therefore, in Step S40, bi-directional communication is verified except for the location of failure. FIG. 26 shows processing of Step S40.

Step S41:

In the case where the location of failure on the backward route is identified, the following processing is performed. That is, in the present example, the forwarding table 42 of the switch 4 next to the switch 5 on the backward route is reset. More specifically, the contents of the forwarding table 42 are changed such that the switch 4 can forward a backward check frame FRB received from the management host 1 to the backward direction and the management host 1. For that purpose, the entry control unit 13 of the management host 1 instructs the table setup unit 44 of the switch 4 to add an entry "input port=HOST, MAC DA=00-00-4c-00-aa-01, MAC SA=00-00-4c-00-12-34, output port=47, HOST" to the forwarding table 42. A table setup command indicating the instruction is transmitted from the entry control unit 13 to the table setup unit 44 through the control link 64. The table setup unit 44 adds the entry in accordance with the table setup command. As a result, the forwarding table 42 of the switch 4 is changed as shown in FIG. 27.

Also, in the case where the location of failure on the forward route is identified, the following processing is performed. That is, in the present example, the forwarding table 52 of the switch 5 next to the switch 4 on the forward route is reset. More specifically, the contents of the forwarding table 52 are changed such that the switch 5 can forward a forward check frame FRA received from the management host 1 to the forward direction and the management host 1. For that purpose, the entry control unit 13 of the management host 1 instructs the table setup unit 54 of the switch 5 to add an entry "input port=HOST, MAC DA=00-00-4c-00-aa-00, MAC SA=00-00-4c-00-12-34, output port=58, HOST" to the forwarding table 52. A table setup command indicating the instruction is transmitted from the entry control unit 13 to the table setup unit 54 through the control link 65. The table setup unit 54 adds the entry in accordance with the table setup command. As a result, the forwarding table 52 of the switch 5 is changed as shown in FIG. 28.

Step S42:

After the Step S41 is completed, the monitoring unit 14 performs transmission of the check frame FR. In the case where the location of failure on the forward route is identified, the monitoring unit 14 transmits one forward check frame FRA. In the case where the location of failure on the backward route is identified, the monitoring unit 14 transmits one backward check frame FRB. Moreover, the monitoring unit 14 starts the third timer TM3 along with the transmission of the check frame FR.

(Forward Check Frame FRA)

The monitoring unit 14 transmits one forward check frame FRA to the switch 5 next to the switch 4 on the forward route. Here, the forward order i is set to 2. The forward order=2 is equal to the forward order of the forward check frame FRA received from the switch 4 at the above-described Step S33 (see FIG. 15). The monitoring unit 14 may newly generate a forward check frame FRA whose forward order i is initialized to 2 or utilize the forward check frame FRA received beforehand from the switch 4. The forward check frame FRA arrives at the switch 5 through the control link 65.

The forwarding processing unit 51 of the switch 5 receives the forward check frame FRA from the management host 1 (HOST) and increases the forward order i of the forward check frame FRA by one. As a result, the forward order i becomes 3. Furthermore, the forwarding processing unit 51 refers to the forwarding table 52 shown in FIG. 28 to forward the received forward check frame FRA to the port 58 (i.e. switch 2) and the HOST (i.e. management host 1). That is, the switch 5 operates as if it receives the forward check frame FRA from the switch 4 (port 57).

After that, the transfer continues similarly. The forwarding processing unit of each switch receives the forward check frame FRA and forwards the forward check frame FRA to the forward direction and the management host 1. As a result, the forward check frame FRA passes through the switches 2, 3 and 5 to reach the management host 1 as shown in FIG. 26. Moreover, the forward check frame FRA is also transmitted from each switch to the management host 1.

(Backward Check Frame FRB)

The monitoring unit 14 transmits one backward check frame FRB to the switch 4 next to the switch 5 on the backward route. Here, the backward order j is set to 4. The backward order=4 is equal to the backward order of the backward check frame FRB received from the switch 5 at the above-described Step S33 (see FIG. 15). The monitoring unit 14 may newly generate a backward check frame FRB whose backward order j is initialized to 4 or utilize the backward check frame FRB received beforehand from the switch 5. The backward check frame FRB arrives at the switch 4 through the control link 64.

The forwarding processing unit 41 of the switch 4 receives the backward check frame FRB from the management host 1 (HOST) and increases the backward order j of the backward check frame FRB by one. As a result, the backward order j becomes 5. Furthermore, the forwarding processing unit 41 refers to the forwarding table 42 shown in FIG. 27 to forward the received backward check frame FRB to the port 47 (i.e. switch 2) and the HOST (i.e. management host 1). That is, the switch 4 operates as if it receives the backward check frame FRB from the switch 5 (port 49).

After that, the transfer continues similarly. The forwarding processing unit of each switch receives the backward check frame FRB and forwards the backward check frame FRB to the backward direction and the management host 1. As a result, the backward check frame FRB passes through the switch 2 to reach the management host 1 as shown in FIG. 26. Moreover, the backward check frame FRB is also transmitted from each switch to the management host 1.

Step S43:

As in the case of the above-described Step S33, the monitoring unit 14 of the management host 1 monitors arrival of the forward check frame FRA/the backward check frame FRB from the switches 2 to 5. Then, in response to reception of the forward check frame FRA, the monitoring unit 14 updates the "forward status" of the related entry in the route table RTE. Also, in response to reception of the backward check frame FRB, the monitoring unit 14 updates the "backward status" of the related entry in the route table RTE. FIG. 29 shows the route table RTE after the updating.

The switch 5 forwards the forward check frame FRA received from the management host 1 to the management host 1 through the control link 65. The monitoring unit 14 receives the forward check frame FRA from the switch 5. However, the monitoring unit 14 does not update the forward status in response to the forward check frame FRA firstly received from the switch 5. The reason is that it is already known that the failure is occurring at the physical link 72 from the switch 4 toward the switch 5.

The switch 2 forwards the forward check frame FRA received from the switch 5 to the management host 1 through the control link 62. The forward order i of the forward check frame FRA is 4. The monitoring unit 14 receives the forward check frame FRA and rewrites the forward status of the entry related to "stopover switch=2, forward order=4" in the route table RTE to "1".

The switch 3 forwards the forward check frame FRA received from the switch 2 to the management host 1 through the control link 63. The forward order i of the forward check frame FRA is 5. The monitoring unit 14 receives the forward check frame FRA and rewrites the forward status of the entry related to "stopover switch=3, forward order=5" in the route table RTE to "1".

The switch 5 forwards the forward check frame FRA received from the switch 3 to the management host 1 through the control link 65. The forward order i of the forward check frame FRA is 6. The monitoring unit 14 receives the forward check frame FRA and rewrites the forward status of the entry related to "stopover switch=5, forward order=6" in the route table RTE to "1".

The switch 4 forwards the backward check frame FRB received from the management host 1 to the management host 1 through the control link 64. The monitoring unit 14 receives the backward check frame FRB from the switch 4. However, the monitoring unit 14 does not update the backward status in response to the backward check frame FRB firstly received from the switch 4. The reason is that it is already known that the failure is occurring at the physical link 72 from the switch 5 toward the switch 4.

The switch 2 forwards the backward check frame FRB received from the switch 4 to the management host 1 through the control link 62. The backward order j of the backward check frame FRB is 6. The monitoring unit 14 receives the backward check frame FRB and rewrites the backward status of the entry related to "stopover switch=2, backward order=6" in the route table RTE to "1".

After the third timer TM3 expires, the monitoring unit 14 refers to the route table RTE. It can be seen from the route table RTE shown in FIG. 29 that the bi-directional failure is occurring at the physical link 72 between the switch 4 and the switch 5 and the other physical links are normal in both directions. In this manner, the monitoring unit 14 can identify the location of failure on the transfer route based on reception state of the forward check frame FRA or the backward check frame FRB from the switches 2 to 5. Furthermore, the bi-directional communication verification is possible with regard to all of the physical links 71 to 75.

Note that if the monitoring unit 14 does not receive the forward check frame FRA from the end-point switch 5 of the forward route or the backward check frame FRB from the end-point switch 2 of the backward route by the time when the timer TM3 expires, it means that another failure is occurring. In this case, the Step S40 is executed recursively.

According to the present exemplary embodiment, the same effects as in the case of the foregoing exemplary embodiments can be obtained. Furthermore, the health-checking is possible with respect to each direction for all of the physical links 71 to 75.

4. Fourth Exemplary Embodiment

According to a fourth exemplary embodiment of the present invention, the backward check frame FRB is not used. That is, the processing of identifying the location of failure is performed by using only the forward check frame FRA.

Figure 30:
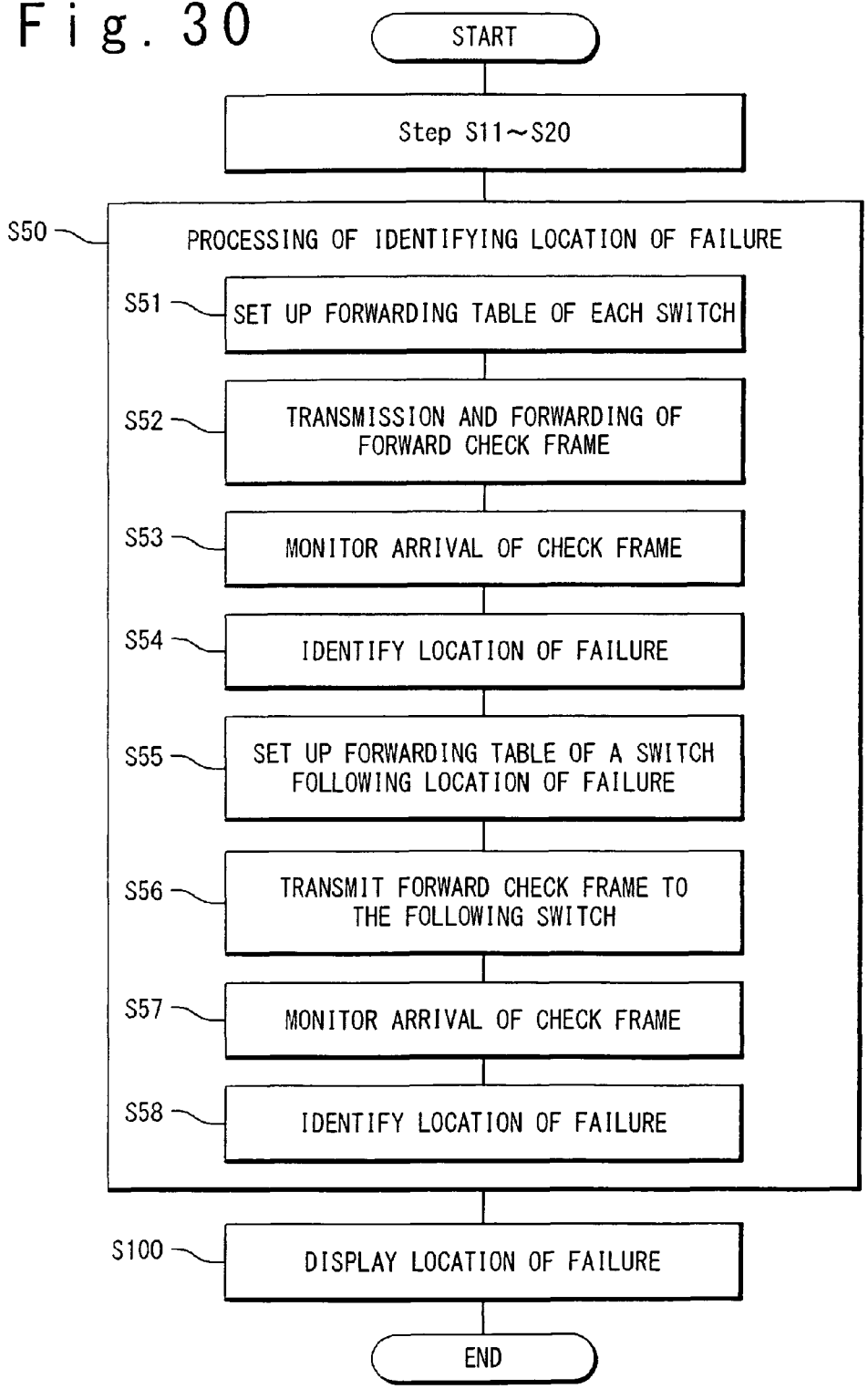
FIG. 30 is a flow chart showing a communication network management method according to a fourth exemplary embodiment of the present invention.

FIG. 30 is a flow chart showing a communication network management method according to the fourth exemplary embodiment. The processing before the detection of failure occurrence on the transfer route (Step S20) is the same as in the case of the foregoing exemplary embodiments. However, the entry related to the backward check frame FRB is omitted from the forwarding table of each switch. Moreover, in the present exemplary embodiment, the route table RTE shown in FIG. 31 is used.

Figure 32:
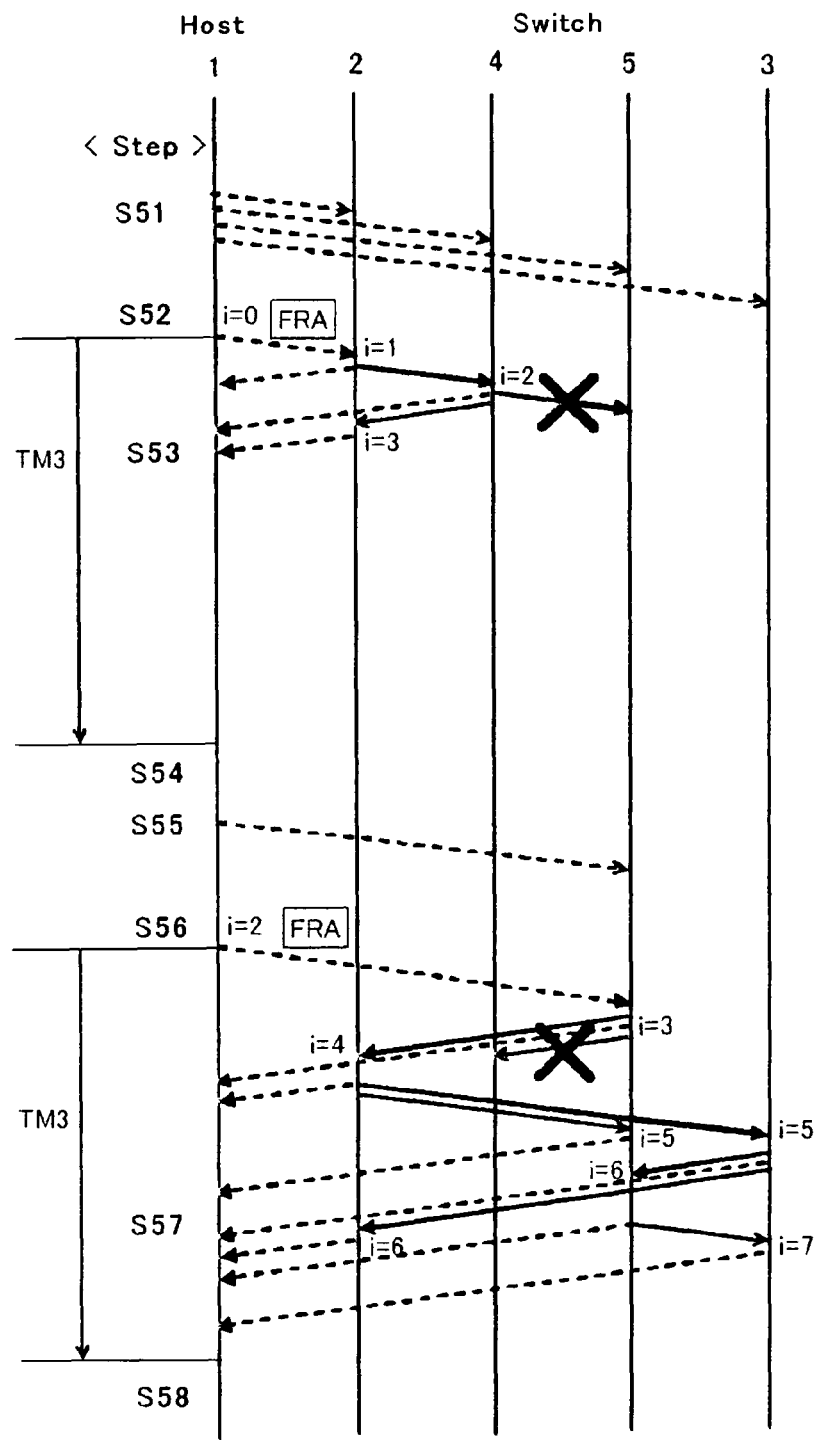
FIG. 32 shows processing of identifying location of failure in the fourth exemplary embodiment.

Step S50:

After the failure occurrence is detected, Step S50 instead of the above-described Step S30 is executed in order to identify location of the failure. FIG. 32 shows processing of Step S50. Let us consider a case where a failure occurs at the physical link 72 between the switch 4 and the switch 5 and communication is not available bi-directionally, as in the case of the foregoing exemplary embodiments.

Step S51:

The entry control unit 13 of the management host 1 instructs the table setup unit of each of the switches 2 to 5 to rewrite each forwarding table. Here, the entry control unit 13 determines contents of the instruction such that the forward check frame FRA received in the forward direction is forwarded to the forward direction, the backward direction and the management host 1 and the forward check frame FRA received in the backward direction is forwarded only to the management host 1. A table setup command indicating the instruction is transmitted from the entry control unit 13 to each switch (2, 3, 4, 5) through the node communication unit 15 and the control link (62, 63, 64, 65).

The table setup unit 24 of the switch 2 rewrites the forwarding table 22 in accordance with the table setup command. FIG. 33 shows the forwarding table 22 after the rewrite. For example, the second entry in the forwarding table 22 means that "the forward check frame FRA received from the port 28 (switch 5) is forwarded to the port 28 (switch 5), the port 29 (switch 3) and the HOST (management host 1)". That is, the forward check frame FRA received in the forward direction from the switch 5 is forwarded to the switch 3 along the forward route, returned back to the switch 5 along the backward route and forwarded to the management host 1 as well. The third entry in the forwarding table 22 means that "the forward check frame FRA received from the port 29 (switch 3) is forwarded to the HOST (management host 1)". That is, the forward check frame FRA received in the backward direction from the switch 3 is forwarded only to the management host 1.

Similarly, the table setup unit 34 of the switch 3, the table setup unit 44 of the switch 4 and the table setup unit 54 of the switch 5 respectively rewrite the forwarding tables 32, 42 and 52 in accordance with the table setup command. FIG. 34, FIG. 35 and FIG. 36 respectively show the forwarding tables 32, 42 and 52 after the rewrite.

Step S52:

After the Step S51 is completed, the monitoring unit 14 of the management host 1 transmits one forward check frame FRA. More specifically, the monitoring unit 14 refers to the route table RTE shown in FIG. 31 to transmit one forward check frame FRA to the start-point switch 2 of the forward route. The forward order i of the forward check frame FRA is initialized to an initial value=0. Moreover, at this time, the monitoring unit 14 starts the third timer TM3.

The forwarding processing unit 21 of the switch 2 receives the forward check frame FRA from the management host 1 (HOST) and increases the forward order i of the forward check frame FRA by one. As a result, the forward order i becomes 1. Furthermore, the forwarding processing unit 21 refers to the forwarding table 22 shown in FIG. 33 to forward the received forward check frame FRA to the port 27 (i.e. switch 4) and the HOST (i.e. management host 1).

The forwarding processing unit 41 of the switch 4 receives the forward check frame FRA from the switch 2 (port 47) and increases the forward order i of the forward check frame FRA by one. As a result, the forward order i becomes 2. Furthermore, the forwarding processing unit 41 refers to the forwarding table 42 shown in FIG. 35 to forward the received forward check frame FRA to the port 47 (i.e. switch 2), the port 49 (i.e. switch 5) and the HOST (i.e. management host 1).

The forwarding processing unit 21 of the switch 2 receives the forward check frame FRA from the switch 4 (port 27) and increases the forward order i of the forward check frame FRA by one. As a result, the forward order i becomes 3. Furthermore, the forwarding processing unit 21 refers to the forwarding table 22 shown in FIG. 33 to forward the received forward check frame FRA to the HOST (i.e. management host 1).

Whereas, the forward check frame FRA output from the port 49 of the switch 4 does not reach the switch 5, because the bi-directional failure is occurring at the physical link 72 connected to the port 49.

Step S53:

As in the case of the above-described Step S33, the monitoring unit 14 of the management host 1 monitors arrival of the forward check frame FRA. Then, in response to reception of the forward check frame FRA, the monitoring unit 14 updates the "forward status" of the related entry in the route table RTE. FIG. 37 shows the route table RTE after the updating.

The switch 2 forwards the forward check frame FRA received from the management host 1 to the management host 1 through the control link 62. The forward order i of the forward check frame FRA is 1. The monitoring unit 14 receives the forward check frame FRA and rewrites the forward status of the entry related to "stopover switch=2, forward order=1" in the route table RTE to "1".

The switch 4 forwards the forward check frame FRA received from the switch 2 to the management host 1 through the control link 64. The forward order i of the forward check frame FRA is 2. The monitoring unit 14 receives the forward check frame FRA and rewrites the forward status of the entry related to "stopover switch=4, forward order=2" in the route table RTE to "1".

The switch 2 forwards the forward check frame FRA received in the backward direction from the switch 4 to the management host 1 through the control link 62. The forward order i of the forward check frame FRA is 3. The monitoring unit 14 receives the forward check frame FRA and rewrites the forward status of the entry related to "stopover switch=2, forward order=3" in the route table RTE to "1".

The management host 1 does not receive the forward check frame FRA from the subsequent switches on the forward route. Therefore, the forward status of the remaining entries each is maintained at "0".

Step S54:

After the third timer TM3 expires, the monitoring unit 14 refers to the route table RTE. It can be seen from the route table RTE shown in FIG. 37 that the forward check frame FRA is normally transferred from the start-point switch 2 to the switch 4 along the forward route but not transferred from the switch 4 to the switch 5. Therefore, the monitoring unit 14 determines that a failure in the forward direction is occurring at the physical link 72 from the switch 4 toward the switch 5. Moreover, it can be also seen that the forward check frame FRA is transferred from the switch 2 to the switch 4 and transferred from the switch 4 to the switch 2. Therefore, the monitoring unit 14 confirms that the physical link 71 between the switch 2 and the switch 4 is normal in both directions.

As described above, the monitoring unit 14 can identify the location of failure on the transfer route based on reception state of the forward check frame FRA from the switches 2 to 5. At the same time, the monitoring unit 14 can perform the bi-directional communication verification with regard to a part of the physical links.

Step S55:

Subsequently, the transfer of the forward check frame FRA is continued by jumping the location of failure, as in the case of the third exemplary embodiment. For that purpose, the forwarding table 52 of the switch 5 next to the switch 4 on the forward route is reset.

More specifically, the contents of the forwarding table 52 are changed such that the switch 5 can forward a forward check frame FRA received from the management host 1 to the forward direction, the backward direction and the management host 1. For that purpose, the entry control unit 13 of the management host 1 instructs the table setup unit 54 of the switch 5 to add an entry "input port=HOST, MAC DA=00-00-4c-00-aa-00, MAC SA=00-00-4c-00-12-34, output port=57, 58, HOST" to the forwarding table 52. A table setup command indicating the instruction is transmitted from the entry control unit 13 to the table setup unit 54 through the control link 65. The table setup unit 54 adds the entry in accordance with the table setup command. As a result, the forwarding table 52 of the switch 5 is changed as shown in FIG. 38.

Step S56:

After the Step S55 is completed, the monitoring unit 14 starts the third timer TM3 again. Also, the monitoring unit 14 transmits one forward check frame FRA to the switch 5 next to the switch 4 on the forward route. Here, the forward order i is set to 2. The forward order=2 is equal to the forward order of the forward check frame FRA received from the switch 4 at the above-described Step S53. The monitoring unit 14 may newly generate a forward check frame FRA whose forward order i is initialized to 2 or utilize the forward check frame FRA received beforehand from the switch 4. The forward check frame FRA arrives at the switch 5 through the control link 65.

The forwarding processing unit 51 of the switch 5 receives the forward check frame FRA from the management host 1 (HOST) and increases the forward order i of the forward check frame FRA by one. As a result, the forward order i becomes 3. Furthermore, the forwarding processing unit 51 refers to the forwarding table 52 shown in FIG. 38 to forward the received forward check frame FRA to the port 57 (i.e. switch 4), the port 58 (i.e. switch 2) and the HOST (i.e. management host 1). That is, the switch 5 operates as if it receives the forward check frame FRA from the switch 4 (port 57).

The forward check frame FRA output from the port 57 of the switch 5 does not reach the switch 4, because the bi-directional failure is occurring at the physical link 72 connected to the port 57.

After that, the transfer continues similarly (see FIG. 32). The forwarding processing unit of each switch receives the forward check frame FRA in the forward direction and forwards the received forward check frame FRA to the forward direction, the backward direction and the management host 1. Moreover, the forwarding processing unit of each switch receives the forward check frame FRA in the backward direction and forwards the received forward check frame FRA to the management host 1.

Step S57:

As in the case of the above-described Step S43, the monitoring unit 14 of the management host 1 monitors arrival of the forward check frame FRA from the switches 2 to 5. Then, in response to reception of the forward check frame FRA, the monitoring unit 14 updates the "forward status" of the related entry in the route table RTE. FIG. 39 shows the route table RTE after the updating.

The switch 5 forwards the forward check frame FRA received from the management host 1 to the management host 1 through the control link 65. The monitoring unit 14 receives the forward check frame FRA from the switch 5. However, the monitoring unit 14 does not update the forward status in response to the forward check frame FRA firstly received from the switch 5. The reason is that it is already known that the failure is occurring at the physical link 72 from the switch 4 toward the switch 5.

The switch 2 forwards the forward check frame FRA received in the forward direction from the switch 5 to the management host 1 through the control link 62. The forward order i of the forward check frame FRA is 4. The monitoring unit 14 receives the forward check frame FRA and rewrites the forward status of the entry related to "stopover switch=2, forward order=4" in the route table RTE to "1".

The switch 3 forwards the forward check frame FRA received in the forward direction from the switch 2 to the management host 1 through the control link 63. The forward order i of the forward check frame FRA is 5. The monitoring unit 14 receives the forward check frame FRA and rewrites the forward status of the entry related to "stopover switch=3, forward order=5" in the route table RTE to "1".

The switch 5 forwards the forward check frame FRA received in the backward direction from the switch 2 to the management host 1 through the control link 65. The forward order i of the forward check frame FRA is 5. The monitoring unit 14 receives the forward check frame FRA and rewrites the forward status of the entry related to "stopover switch=5, forward order=5" in the route table RTE to "1".

The switch 2 forwards the forward check frame FRA received in the backward direction from the switch 3 to the management host 1 through the control link 62. The forward order i of the forward check frame FRA is 6. The monitoring unit 14 receives the forward check frame FRA and rewrites the forward status of the entry related to "stopover switch=2, forward order=6" in the route table RTE to "1".

The switch 5 forwards the forward check frame FRA received in the forward direction from the switch 3 to the management host 1 through the control link 65. The forward order i of the forward check frame FRA is 6. The monitoring unit 14 receives the forward check frame FRA and rewrites the forward status of the entry related to "stopover switch=5, forward order=6" in the route table RTE to "1".

The switch 3 forwards the forward check frame FRA received in the backward direction from the switch 5 to the management host 1 through the control link 63. The forward order i of the forward check frame FRA is 7. The monitoring unit 14 receives the forward check frame FRA and rewrites the forward status of the entry related to "stopover switch=3, forward order=7" in the route table RTE to "1".

Step S58:

After the third timer TM3 expires, the monitoring unit 14 refers to the route table RTE. It can be seen from the route table RTE shown in FIG. 39 that the forward check frame FRA is not transferred from the switch 4 to the switch 5. It can be also seen that the forward check frame FRA is not transferred from the switch 5 to the switch 4. Moreover, it can be seen that the forward check frame FRA is normally transferred at the other sections. Therefore, the monitoring unit 14 determines that the bi-directional failure is occurring at the physical link 72 between the switch 4 and the switch 5. Also, the monitoring unit 14 confirms that the other physical links are normal in both directions.

As described above, the monitoring unit 14 can identify the location of failure on the transfer route based on reception state of the forward check frame FRA from the switches 2 to 5. Furthermore, the monitoring unit 14 can perform the bi-directional communication verification with regard to all of the physical links. According to the present exemplary embodiment, the same effects as in the case of the third exemplary embodiment can be obtained.

The present invention can be applied to other than the health-check. For example, the present invention may be applied to setup and control of each node. In that case, a control frame (control packet) is used instead of the check frame (check packet). Also, a test frame (test packet), an inspection frame (inspection packet), a survey frame (survey packet), a search frame (search packet), a verification frame (verification packet), a test frame (test packet), a keep-alive frame (keep-alive packet) and the like may be used instead of the check frame (check packet).

While the exemplary embodiments of the present invention have been described above with reference to the attached drawings, the present invention is not limited to these exemplary embodiments and can be modified as appropriate by those skilled in the art without departing from the spirit and scope of the present invention.

This application is based upon and claims the benefit of priority from Japanese patent application No. 2008-307670, filed on Dec. 2, 2008, the disclosure of which is incorporated herein in its entirely by reference.

The invention claimed is:

1. A communication network management system comprising:
   a communication network including a plurality of nodes and a plurality of links connecting between said plurality of nodes; and
   a management computer configured to manage said communication network,
   wherein said management computer comprises:
      a storage unit in which a route information indicating a transfer route of frames in said communication network is stored; and
      a monitoring unit configured to perform, based on said route information, transmission and reception of frames to and from said communication network,
   wherein said monitoring unit transmits a frame to said transfer route,
   wherein when receiving said frame, each of said plurality of nodes not only forwards said received frame along said transfer route but also sends a reply to said management computer, and
   wherein said monitoring unit identifies a location of a failure occurrence on said transfer route, based on reception state of said reply from said plurality of nodes.

2. The communication network management system according to claim 1, wherein said each node forwards said received frame as said reply to said management computer.

3. The communication network management system according to claim 2, wherein said each node comprises:
   a table storage unit in which a forwarding table indicating a correspondence relationship between an input source and a forwarding destination of frames is stored; and
   a forwarding processing unit configured to forward a frame received from said input source to said forwarding destination by referring to said forwarding table,
   wherein said forwarding table of said each node is set such that said forwarding processing unit forwards said received frame along said transfer route and to said management computer, and wherein said forwarding processing unit of said each node forwards said received frame as said reply to said management computer.

4. The communication network management system according to claim 1, wherein said plurality of nodes include:
a start-point node comprising a start-point of said transfer route in a forward direction; and
an end-point node comprising an end-point of said transfer route in said forward direction,
wherein said monitoring unit transmits a first forward frame to said start-point node,
wherein when receiving said first forward frame, said each node not only forwards said received first forward frame to said forward direction but also sends said reply to said management computer,
wherein said plurality of nodes include a first node and a second node that are successive in said forward direction on said transfer route, and
wherein if said monitoring unit receives said reply from said first node and does not receive said reply from said second node, said monitoring unit determines that a failure occurs between said first node and said second node.

5. The communication network management system according to claim 4, wherein said end-point node comprises a start-point of said transfer route in a backward direction, and said start-point node comprises an end-point of said transfer route in said backward direction,
wherein said monitoring unit further transmits a first backward frame to said end-point node,
wherein when receiving said first backward frame, said each node not only forwards said received first backward frame to said backward direction but also sends said reply to said management computer, and
wherein if said monitoring unit receives said reply from said second node and does not receive said reply from said first node, said monitoring unit determines that a bi-directional failure occurs between said first node and said second node.

6. The communication network management system according to claim 5, wherein said monitoring unit further transmits a second forward frame to said second node and transmits a second backward frame to said first node,
wherein when receiving said second forward frame, said each node not only forwards said received second forward frame to said forward direction but also sends said reply to said management computer, and
wherein when receiving said second backward frame, said each node not only forwards said received second backward frame to said backward direction but also sends said reply to said management computer.

7. The communication network management system according to claim 1, wherein when receiving a frame in a forward direction of said transfer route, said each node not only forwards said received frame along said forward direction and a backward direction of said transfer route but also sends said reply to said management computer, and
wherein when receiving a frame in said backward direction of said transfer route, said each node sends said reply to said management computer.

8. The communication network management system according to claim 7, wherein said each node comprises:
a table storage unit in which a forwarding table indicating a correspondence relationship between an input source and a forwarding destination of frames is stored; and
a forwarding processing unit configured to forward a frame received from said input source to said forwarding destination by referring to said forwarding table,
wherein said forwarding table of said each node is set such that said forwarding processing unit forwards said frame received in said forward direction to said forward direction, said backward direction and said management computer and forwards said frame received in said backward direction only to said management computer, and
wherein said forwarding processing unit of said each node forwards said received frame as said reply to said management computer.

9. The communication network management system according to claim 7, wherein said plurality of nodes include:
a start-point node comprising a start-point of said transfer route in the forward direction; and
an end-point node comprising an end-point of said transfer route in said forward direction,
wherein said monitoring unit transmits a third forward frame to said start-point node,
wherein when receiving said third forward frame in said forward direction, said each node not only forwards said received third forward frame to said forward direction and said backward direction but also sends said reply to said management computer,
wherein when receiving said third forward frame in said backward direction, said each node sends said reply to said management computer,
wherein said plurality of nodes include a first node and a second node that are successive in said forward direction on said transfer route, and
wherein if said monitoring unit receives said reply from said first node and does not receive said reply from said second node, said monitoring unit determines that a failure occurs between said first node and said second node.

10. The communication network management system according to claim 9, wherein said monitoring unit further transmits a fourth forward frame to said second node,
wherein when receiving said fourth forward frame in said forward direction, said each node not only forwards said received fourth forward frame to said forward direction and said backward direction but also sends said reply to said management computer, and
wherein when receiving said fourth forward frame in said backward direction, said each node sends said reply to said management computer.

11. A management computer that manages a communication network including a plurality of nodes and a plurality of links connecting between said plurality of nodes, said management computer comprising:
an entry control unit configured to instruct each of said plurality of nodes to, when receiving a frame, not only forward said received frame along a transfer route but also send a reply to said management computer; and
a monitoring unit configured to perform, based on route information, transmission and reception of frames to and from said communication network,
wherein said monitoring unit transmits said frame to said transfer route and identifies a location of failure occurrence on said transfer route, based on a reception state of said reply from said plurality of nodes.

12. The management computer according to claim 11, wherein said entry control unit instructs said each node to forward said received frame as said reply to said management computer.

13. The management computer according to claim 12, wherein said each node refers to a forwarding table indicating a correspondence relationship between an input source and a forwarding destination of frames to forward a frame received from said input source to said forwarding destination, and
wherein said entry control unit instructs said each node to set up said forwarding table such that said received frame is forwarded along said transfer route and also forwarded as said reply to said management computer.

14. The management computer according to claim 11, wherein said plurality of nodes include:
a start-point node comprising a start-point of said transfer route in a forward direction; and
an end-point node comprising an end-point of said transfer route in said forward direction,
wherein said monitoring unit transmits a first forward frame to said start-point node,
wherein said plurality of nodes include a first node and a second node that are successive in said forward direction on said transfer route, and
wherein if said monitoring unit receives said reply from said first node and does not receive said reply from said second node, said monitoring unit determines that a failure occurs between said first node and said second node.

15. The management computer according to claim 14, wherein said end-point node comprises a start-point of said transfer route in a backward direction, and said start-point node comprises an end-point of said transfer route in said backward direction,
wherein said monitoring unit further transmits a first backward frame to said end-point node, and
wherein if said monitoring unit receives said reply from said second node and does not receive said reply from said first node, said monitoring unit determines that a bi-directional failure occurs between said first node and said second node.

16. The management computer according to claim 11, wherein said entry control unit instructs said each node to, when receiving a frame in a forward direction of said transfer route, not only forward said received frame along said forward direction and a backward direction of said transfer route but also send said reply to said management computer, and to, when receiving a frame in said backward direction of said transfer route, send said reply to said management computer.

17. A node in a communication network management system, said communication network management system comprising:
a communication network including a plurality of nodes and a plurality of links connecting between said plurality of nodes; and
a management computer configured to manage said communication network,
wherein a frame transmitted from said management computer is transferred along a predetermined transfer route in said communication network, and
wherein said node, when receiving said frame, not only forwards said received frame along said predetermined transfer route but also sends a reply to said management computer.

18. The node according to claim 17, further comprising forwarding said received frame as said reply to said management computer.

19. The node according to claim 18, comprising:
a table storage unit in which a forwarding table indicating a correspondence relationship between an input source and a forwarding destination of frames is stored; and
a forwarding processing unit configured to forward a frame received from said input source to said forwarding destination by referring to said forwarding table,
wherein said forwarding table is set such that said forwarding processing unit forwards said received frame along said predetermined transfer route and to said management computer, and
wherein said forwarding processing unit forwards said received frame as said reply to said management computer.

20. A communication network management method that manages a communication network by using a management computer,
wherein said communication network includes a plurality of nodes and a plurality of links connecting between said plurality of nodes,
wherein said communication network management method comprises:
transmitting, by said management computer, a frame to a transfer route in said communication network;
sending, by each of said plurality of nodes, when receiving said frame, a reply to said management computer as well as forwarding said received frame along said transfer route; and
identifying, by said management computer, a location of a failure occurrence on said transfer route, based on reception state of said reply from said plurality of nodes.

21. The communication network management method according to claim 20, wherein said sending said reply by said each node comprises forwarding, by said each node, said received frame as said reply to said management computer.

22. The communication network management method according to claim 21, wherein said each node refers to a forwarding table indicating a correspondence relationship between an input source and a forwarding destination of frames to forward a frame received from said input source to said forwarding destination, and
wherein said communication network management method further comprises:
instructing, by said management computer, said each node to set up said forwarding table such that said received frame is forwarded along said transfer route and also forwarded as said reply to said management computer.

23. A non-transitory computer-readable recording medium in which a management program is recorded,
wherein said management program causes a management computer to perform management processing for a communication network,
wherein said communication network includes a plurality of nodes and a plurality of links connecting between said plurality of nodes, and
wherein said management processing comprises:
storing a route information indicating a transfer route of frames in said communication network in a storage device;
instructing each of said plurality of nodes to, when receiving a frame, not only forward said received frame along said transfer route but also send a reply to said management computer;
transmitting said frame to said transfer route based on said route information; and
identifying a location of a failure occurrence on said transfer route, based on reception state of said reply from said plurality of nodes.

24. The non-transitory computer-readable recording medium according to claim 23, wherein said instructing comprises instructing said each node to forward said received frame as said reply to said management computer.

25. The non-transitory computer-readable recording medium according to claim 24,
wherein said each node refers to a forwarding table indicating a correspondence relationship between an input source and a forwarding destination of frames to forward a frame received from said input source to said forwarding destination, and
wherein said instructing comprises instructing said each node to set up said forwarding table such that said received frame is forwarded along said transfer route and also forwarded as said reply to said management computer.

* * * * *